(12) United States Patent
Shultz et al.

(10) Patent No.: US 11,530,742 B2
(45) Date of Patent: *Dec. 20, 2022

(54) TRANSMISSION SYSTEMS TO CONTROL HEAT EXCHANGERS TO MANAGE TRANSMISSION SUMP TEMPERATURE

(71) Applicant: ALLISON TRANSMISSION, INC., Indianapolis, IN (US)

(72) Inventors: Jeffrey E. Shultz, Zionsville, IN (US); Bruno Re, Turin (IT)

(73) Assignee: ALLISON TRANSMISSION, INC., Indianapolis, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/379,478

(22) Filed: Jul. 19, 2021

(65) Prior Publication Data

US 2022/0003307 A1    Jan. 6, 2022

Related U.S. Application Data

(63) Continuation of application No. 16/589,557, filed on Oct. 1, 2019, now Pat. No. 11,111,999.

(51) Int. Cl.
*F16H 57/04*      (2010.01)
*B60W 10/18*    (2012.01)
*B60W 10/30*    (2006.01)

(52) U.S. Cl.
CPC ......... *F16H 57/0413* (2013.01); *B60W 10/18* (2013.01); *B60W 10/30* (2013.01)

(58) Field of Classification Search
CPC .. F16H 57/0413; F16H 57/0417; F16H 59/54; F16H 61/12; B60W 10/18; B60W 10/30
See application file for complete search history.

(56) References Cited

U.S. PATENT DOCUMENTS

| | | |
|---|---|---|
| 4,915,204 A | 4/1990 | Klotz et al. |
| 4,916,961 A | 4/1990 | Holbrook et al. |
| (Continued) | | |

FOREIGN PATENT DOCUMENTS

| | | |
|---|---|---|
| CN | 101398075 A | 1/2013 |
| DE | 68924962 T2 | 1/1997 |
| (Continued) | | |

OTHER PUBLICATIONS

Zoz et al., Engine Lubrication System Model for Sump Oil Temperature Prediction, SAE Technical Paper Series, 2001, 15 pages.

(Continued)

*Primary Examiner* — Edwin A Young
(74) *Attorney, Agent, or Firm* — Taft Stettinius & Hollister LLP; Stephen F. Rost

(57) ABSTRACT

Transmission systems, control systems for vehicles, and methods of operating vehicles are disclosed herein. A transmission system for a vehicle includes a transmission and a heat exchanger. The transmission is configured to receive rotational power supplied by a drive unit and provide the rotational power to a load in use of the transmission system. The heat exchanger is fluidly coupled to the transmission and configured to cool a sump of the transmission to manage transmission oil temperature in use of the transmission system. The transmission includes a control system having a plurality of sensors and a controller coupled to the plurality of sensors that has a processor and a memory device coupled to the processor.

20 Claims, 11 Drawing Sheets

(56) References Cited

U.S. PATENT DOCUMENTS

| | | |
|---|---|---|
| 4,928,235 A | 5/1990 | Mehta et al. |
| 4,935,872 A | 6/1990 | Benford et al. |
| 4,936,167 A | 6/1990 | Mehta |
| 4,938,102 A | 7/1990 | Leising et al. |
| 4,944,200 A | 7/1990 | Benford et al. |
| 4,964,506 A | 10/1990 | Benford et al. |
| 4,982,620 A | 1/1991 | Holbrook et al. |
| 4,998,450 A | 3/1991 | Nogle |
| 5,027,934 A | 7/1991 | Benford |
| 5,115,698 A | 5/1992 | Leising et al. |
| 5,174,334 A | 12/1992 | Nogle |
| 5,211,080 A | 5/1993 | Leising et al. |
| 5,319,963 A | 6/1994 | Benford et al. |
| 5,678,461 A | 10/1997 | Stine et al. |
| 5,857,162 A | 1/1999 | Vukovich et al. |
| 6,328,000 B1 | 12/2001 | Hawkins et al. |
| 6,449,538 B1 | 9/2002 | Kubo et al. |
| 6,453,853 B1 | 9/2002 | Hawkins et al. |
| 6,466,854 B1 | 10/2002 | Henneken et al. |
| 6,663,279 B1 | 12/2003 | Karl-Fritz et al. |
| 6,959,239 B2 | 10/2005 | Williams et al. |
| 7,217,222 B2 | 5/2007 | Centlivre et al. |
| 7,747,366 B2 | 6/2010 | Karlsson |
| 8,145,410 B2 | 3/2012 | Berger et al. |
| 8,714,310 B2 | 5/2014 | Bares et al. |
| 9,732,838 B2 | 8/2017 | McKimpson et al. |
| 11,111,999 B2 * | 9/2021 | Shultz .................. B60W 10/18 |
| 2003/0188937 A1 | 10/2003 | Schneider et al. |
| 2012/0102952 A1 | 5/2012 | Spohn et al. |
| 2013/0092349 A1 | 4/2013 | Curtis et al. |
| 2017/0292513 A1 | 10/2017 | Haddad et al. |
| 2018/0043751 A1 | 2/2018 | Steinmetz et al. |
| 2018/0045100 A1 | 2/2018 | Steinmetz et al. |

FOREIGN PATENT DOCUMENTS

| | | |
|---|---|---|
| DE | 102015215465 A1 | 2/2017 |
| EP | 1769421 | 4/2007 |
| GB | 2320339 A | 3/1999 |
| JP | 3395447 B2 | 4/2003 |
| JP | 2004324613 A | 11/2004 |
| JP | 2015059631 A | 3/2015 |
| WO | 2008000602 A1 | 1/2008 |
| WO | 2013029750 A2 | 3/2013 |
| WO | 2016131448 A1 | 8/2016 |

OTHER PUBLICATIONS

Haury et al., Modelisation of the engine coolant warming-up behavior, Chalmers, 2011, 82 pages.

Agarwal, Modeling, Validation and Analysis of an Advanced Thermal Management System for Conventional Automotive Powertrains, 2012, 293 pages.

ZF Friedrichshafen AG, Operating Instructions Bus ZF-EcoLife for City Buses, Intercity Buses, and Coaches, 2013, 38 pages.

Tojcic, Effects of Heat Transfer on Vehicle Front-end Cooling Airflow Simulation, Electronic Theses and Dissertations, 2017, 114 pages.

* cited by examiner

FIG. 7

| | Previous Output Status | | Inputs | | | | | Next Output Status | |
|---|---|---|---|---|---|---|---|---|---|
| | GPIO Output 2 (FAN Control) | GPIO Output 1 (Thermostat) | Retarder Activation Or Engine Brake Activation Or Transmission Diagnostic Recovery | Sump T<T0 | Predicted Sump T>T1 | Sump T>T2 | Sump T<T3 | GPIO Output 1 (Thermostat) | GPIO Output 1 2 |
| 748 | FAN active | Off | No | No | Yes | N/A | N/A | Off | FAN active |
| 746 | FAN active | Off | No | No | N/A | Yes | N/A | Off | FAN active |
| 744 | FAN active | Off | No | No | No | No | Yes | Off | FAN inactive |
| 742 | FAN active | Off | No | No | Yes | N/A | N/A | Off | FAN active |
| 740 | FAN inactive | Off | No | No | N/A | Yes | N/A | Off | FAN active |
| 738 | FAN inactive | Off | No | No | No | No | Yes | Off | FAN inactive |
| 736 | FAN inactive | Off | No | No | No | N/A | N/A | Off | FAN inactive |
| 734 | FAN active | Off | Yes | No | N/A | N/A | N/A | Off | FAN active |
| 732 | FAN inactive | Off | Yes | No | N/A | N/A | N/A | Off | FAN active |
| 730 | N/A | On | N/A | Yes | N/A | N/A | N/A | On | FAN inactive |
| 728 | N/A | Off | N/A | Yes | N/A | N/A | N/A | On | FAN inactive |

TRANSMISSION SYSTEMS TO CONTROL HEAT EXCHANGERS TO MANAGE TRANSMISSION SUMP TEMPERATURE

CROSS-REFERENCE TO RELATED APPLICATION(S)

This application claims the priority benefit of, and is a continuation of, U.S. application Ser. No. 16/589,557 entitled "Transmission Systems to Control Heat Exchangers to Manage Transmission Sump Temperature," which was filed on Oct. 1, 2019. The disclosure of that prior application is incorporated by reference herein in its entirety.

FIELD OF THE DISCLOSURE

The present disclosure relates, generally, to transmission systems, and, more specifically, to transmission systems incorporating one or more heat exchangers.

BACKGROUND

Heat exchangers may be used to cool oil stored in transmission sumps to manage sump temperature in use of the transmissions. In some applications, cooling systems incorporating such heat exchangers may provide, or otherwise be associated with, excessive cost and/or complexity, as well as limited performance. Systems and/or devices to improve cooling system performance that avoid the aforementioned shortcomings remain an area of interest.

SUMMARY

The present disclosure may comprise one or more of the following features and combinations thereof.

According to one aspect of the present disclosure, a transmission system for a vehicle may include a transmission and a heat exchanger. The transmission may be configured to receive rotational power supplied by a drive unit and provide the rotational power to a load in use of the transmission system. The heat exchanger may be fluidly coupled to the transmission and configured to cool a sump of the transmission to manage transmission oil temperature in use of the transmission system. The transmission may include a control system having a plurality of sensors and a controller coupled to the plurality of sensors that has a processor and a memory device coupled to the processor. At least one of the plurality of sensors may be configured to provide sensor data indicative of a state of a braking device of the vehicle or a fault state of the vehicle. The memory device may have instructions stored therein that are executable by the processor to cause the processor to receive the sensor data from the at least one of the plurality of sensors and to control operation of the heat exchanger to selectively cool the sump by the heat exchanger based on the sensor data to promote fuel economy in use of the transmission system.

In some embodiments, the plurality of sensors may include a first brake sensor configured to provide brake sensor data indicative of a state of a first braking device of the vehicle and a fault diagnostic sensor configured to provide fault diagnostic data indicative of the fault state of the vehicle, and the instructions stored in the memory device may be executable by the processor to cause the processor to receive the brake sensor data from the first brake sensor and the fault diagnostic data from the fault diagnostic sensor and to selectively cool the sump by the heat exchanger based on the brake sensor data and the fault diagnostic data. The brake sensor data from the first brake sensor may be indicative of a state of a retarder of the vehicle, the plurality of sensors may include a second brake sensor configured to provide brake sensor data indicative of a state of an engine brake of the vehicle, and the instructions stored in the memory device may be executable by the processor to cause the processor to: receive the brake sensor data from the first and second brake sensors and the fault diagnostic data from the fault diagnostic sensor; determine whether the retarder is active based on the brake sensor data from the first brake sensor; determine whether the engine brake is active based on the brake sensor data from the second brake sensor; determine whether a fault is present based on the fault diagnostic data from the fault diagnostic sensor; and cool the sump by the heat exchanger in response to a determination that the retarder is active, that the engine brake is active, or that the fault is present.

In some embodiments, the instructions stored in the memory device may be executable by the processor to cause the processor to, in response to a determination that the retarder is inactive, that the engine brake is inactive, and that the fault is not present, determine whether a predicted temperature of the sump is greater than a first temperature threshold or whether a current temperature of the sump is greater than a second temperature threshold, and to cool the sump by the heat exchanger in response to a determination that the predicted temperature of the sump is greater than the first temperature threshold or a determination that the current temperature of the sump is greater than the second temperature threshold. The instructions stored in the memory device may be executable by the processor to cause the processor to, in response to a determination that the predicted temperature of the sump is not greater than the first temperature threshold and a determination that the current temperature of the sump is not greater than the second temperature threshold, determine whether the predicted temperature of the sump is less than the first temperature threshold and whether the current temperature of the sump is less than a third temperature threshold, and to disable cooling of the sump by the heat exchanger in response to a determination that the predicted temperature of the sump is less than the first temperature threshold and the current temperature of the sump is less than the third temperature threshold.

In some embodiments, the instructions stored in the memory device may be executable by the processor to cause the processor to selectively cool the sump based on a predicted temperature of the sump in use of the transmission system. The instructions stored in the memory device may be executable by the processor to cause the processor to predict the sump temperature based on a predicted rate of change in sump temperature ($\Delta_{temp}$) multiplied by a prediction time interval ($t_{horizon}$) and summed with a current sump temperature sample value ($T_n$). The instructions stored in the memory device may be executable by the processor to cause the processor to predict the rate of change in sump temperature ($\Delta_{temp}$) based on a previous predicted rate of change of sump temperature ($\Delta_{temp\_previous}$), the current sump temperature sample value ($T_n$), a previous sump temperature sample value ($T_{n-1}$), a time measurement rate ($t_{measurement\_rate}$), and a constant reference value ($K_{filter}$), and the instructions stored in the memory device may be executable by the processor to cause the processor to predict the rate of change in sump temperature ($\Delta_{temp}$) according to the equation $$\Delta_{temp} = \Delta_{temp\_previous} + ([T_n - T_{n-1}]/t_{measurement\_rate} - \Delta_{temp\_previous})/K_{filter}.$$

In some embodiments, the instructions stored in the memory device may be executable by the processor to cause the processor to determine the constant reference value ($K_{filter}$) based on temperature sensor data indicative of an ambient air temperature and based on mode sensor data indicative of an operational mode of a torque converter or a retarder. Additionally, in some embodiments, the instructions stored in the memory device may be executable by the processor to cause the processor to determine the current sump temperature sample value ($T_n$) and the previous sump temperature sample value ($T_{n-1}$) over one second time intervals and to determine the prediction time interval ($t_{horizon}$) over thirty second intervals.

In some embodiments, the instructions stored in the memory device may executable by the processor to cause the processor to: receive brake sensor data from a first brake sensor indicative of a state of a retarder of the vehicle; receive brake sensor data from a second brake sensor indicative of a state of an engine brake of the vehicle; receive brake sensor data from a third brake sensor indicative of a state of a service brake of the vehicle; receive fault data from a fault diagnostic sensor indicative of the fault state of the vehicle; receive grade data from an inclinometer indicative of a grade of a surface on which the vehicle is positioned; receive accelerator data from an accelerator sensor indicative of depression of an accelerator pedal of the vehicle; receive temperature data from an air temperature sensor indicative of an ambient air temperature; receive input provided by an operator; receive mode sensor data from a torque converter sensor indicative of an operational mode of a torque converter; and selectively cool the sump by the heat exchanger based on the brake sensor data from the first, second, and third brake sensors, the fault data, the grade data, the accelerator data, the temperature data, the input provided by the operator, and the mode sensor data.

According to another aspect of the present disclosure, a control system for a vehicle that includes a transmission configured to receive rotational power supplied by a drive unit and provide the rotational power to a load and a heat exchanger fluidly coupled to the transmission and configured to cool a sump of the transmission to manage transmission oil temperature may include a first brake sensor, a fault diagnostic sensor, and a controller. The first brake sensor may be configured to provide brake sensor data indicative of a state of a first braking device of the vehicle. The fault diagnostic sensor may be configured to provide fault diagnostic data indicative of a fault state of the vehicle. The controller may be communicatively coupled to the first brake sensor and the fault diagnostic sensor, and the controller may include a memory device having instructions stored therein that are executable by a processor to cause the processor to receive the brake sensor data from the first brake sensor and the fault diagnostic data from the fault diagnostic sensor and to selectively cool the sump by the heat exchanger based on the brake sensor data and the fault diagnostic data to promote fuel economy in use of the control system.

In some embodiments, the control system may include a second brake sensor configured to provide brake sensor data indicative of a state of a second braking device of the vehicle, and the instructions stored in the memory may be executable by the processor to cause the processor to: receive the brake sensor data from the first and second brake sensors and the fault diagnostic data from the fault diagnostic sensor; determine whether a retarder of the vehicle is active based on the brake sensor data from the first brake sensor; determine whether an engine brake of the vehicle is active based on the brake sensor data from the second brake sensor; determine whether a fault is present based on the fault diagnostic data from the fault diagnostic sensor; and cool the sump by the heat exchanger in response to a determination that the retarder is active, that the engine brake is active, or that the fault is present. The instructions stored in the memory device may be executable by the processor to cause the processor to, in response to a determination that the retarder is inactive, that the engine brake is inactive, and that the fault is not present, determine whether a predicted temperature of the sump is greater than a first temperature threshold or whether a current temperature of the sump is greater than a second temperature threshold, and to cool the sump by the heat exchanger in response to a determination that the predicted temperature of the sump is greater than the first temperature threshold or a determination that the current temperature of the sump is greater than the second temperature threshold.

In some embodiments, the instructions stored in the memory device may be executable by the processor to cause the processor to, in response to a determination that the predicted temperature of the sump is not greater than the first temperature threshold and a determination that the current temperature of the sump is not greater than the second temperature threshold, determine whether the predicted temperature of the sump is less than the first temperature threshold and whether the current temperature of the sump is less than a third temperature threshold, and to disable cooling of the sump by the heat exchanger in response to a determination that the predicted temperature of the sump is less than the first temperature threshold and the current temperature of the sump is less than the third temperature threshold. Additionally, in some embodiments, the instructions stored in the memory device may be executable by the processor to cause the processor to: selectively cool the sump based on a predicted temperature of the sump in use of the control system; predict the sump temperature based on a predicted rate of change in sump temperature ($\Delta_{temp}$) multiplied by a prediction time interval ($t_{horizon}$) and summed with a current sump temperature sample value ($T_n$); and predict the rate of change in sump temperature ($\Delta_{temp}$) based on a previous predicted rate of change of sump temperature ($\Delta_{temp\_previous}$), the current sump temperature sample value ($T_n$), a previous sump temperature sample value ($T_{n-1}$), a time measurement rate ($T_{measurement\_rate}$), and a constant reference value ($K_{filter}$) according to the equation $$\Delta_{temp} = \Delta_{temp\_previous} + ([T_n - T_{n-1}]/t_{measurement\_rate} - \Delta_{temp\_previous})/K_{filter}.$$

According to yet another aspect of the present disclosure, a method of operating a vehicle that includes a transmission configured to receive rotational power supplied by a drive unit and provide the rotational power to a load and a heat exchanger fluidly coupled to the transmission and configured to cool a sump of the transmission to manage transmission oil temperature may include receiving, by a controller of the vehicle, brake sensor data provided by a first brake sensor of the vehicle that is indicative of a state of a first braking device of the vehicle; receiving, by the controller, fault diagnostic data provided by a fault diagnostic sensor of the vehicle that is indicative of a fault state of the vehicle; and selectively cooling, by the controller using the heat exchanger, the sump based on the brake sensor data and the fault diagnostic data to promote fuel economy in use of the vehicle.

In some embodiments, the method may include receiving, by the controller, brake sensor data provided by a second brake sensor of the vehicle that is indicative of a state of a second braking device of the vehicle; determining, by the controller, whether a retarder of the vehicle is active based on the brake sensor input data from the first brake sensor; determining, by the controller, whether an engine brake of the vehicle is active based on the brake sensor data from the second brake sensor; determining, by the controller, whether a fault is present based on the fault diagnostic data from the fault diagnostic sensor; and cooling, by the controller using the heat exchanger, the sump in response to a determination that the retarder is active, that the engine brake is active, or that the fault is present. The method may include determining, by the controller in response to a determination that the retarder is inactive, that the engine brake is inactive, or that the fault is not present, whether a predicted temperature of the sump is greater than a first temperature threshold or whether a current temperature of the sump is greater than a second temperature threshold; and cooling, by the controller using the heat exchanger, the sump in response to a determination that the predicted temperature of the sump is greater than the first temperature threshold or a determination that the current temperature of the sump is greater than the second temperature threshold. Additionally, in some embodiments, the method may include selectively cooling, by the controller using the heat exchanger, the sump based on a predicted temperature of the sump in use of the vehicle; predicting, by the controller, the sump temperature based on a predicted rate of change in sump temperature ($\Delta_{temp}$) multiplied by a prediction time interval ($t_{horizon}$) and summed with a current sump temperature sample value ($T_n$); and predicting, by the controller, the rate of change in sump temperature ($\Delta_{temp}$) based on a previous predicted rate of change of sump temperature ($\Delta_{temp\_previous}$), the current sump temperature sample value ($T_n$), a previous sump temperature sample value ($T_{n-1}$), a time measurement rate ($t_{measurement\_rate}$), and a constant reference value ($K_{filter}$) according to the equation $$\Delta_{temp} = \Delta_{temp\_previous} + ([T_n - T_{n-1}]/t_{measurement\_rate} - \Delta_{temp\_previous})/K_{filter}.$$

These and other features of the present disclosure will become more apparent from the following description of the illustrative embodiments.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

FIG. 7 is a table depicting various input and output states associated with the performance of the method of FIGS. 6A and 6B;

DETAILED DESCRIPTION

Figure 1:
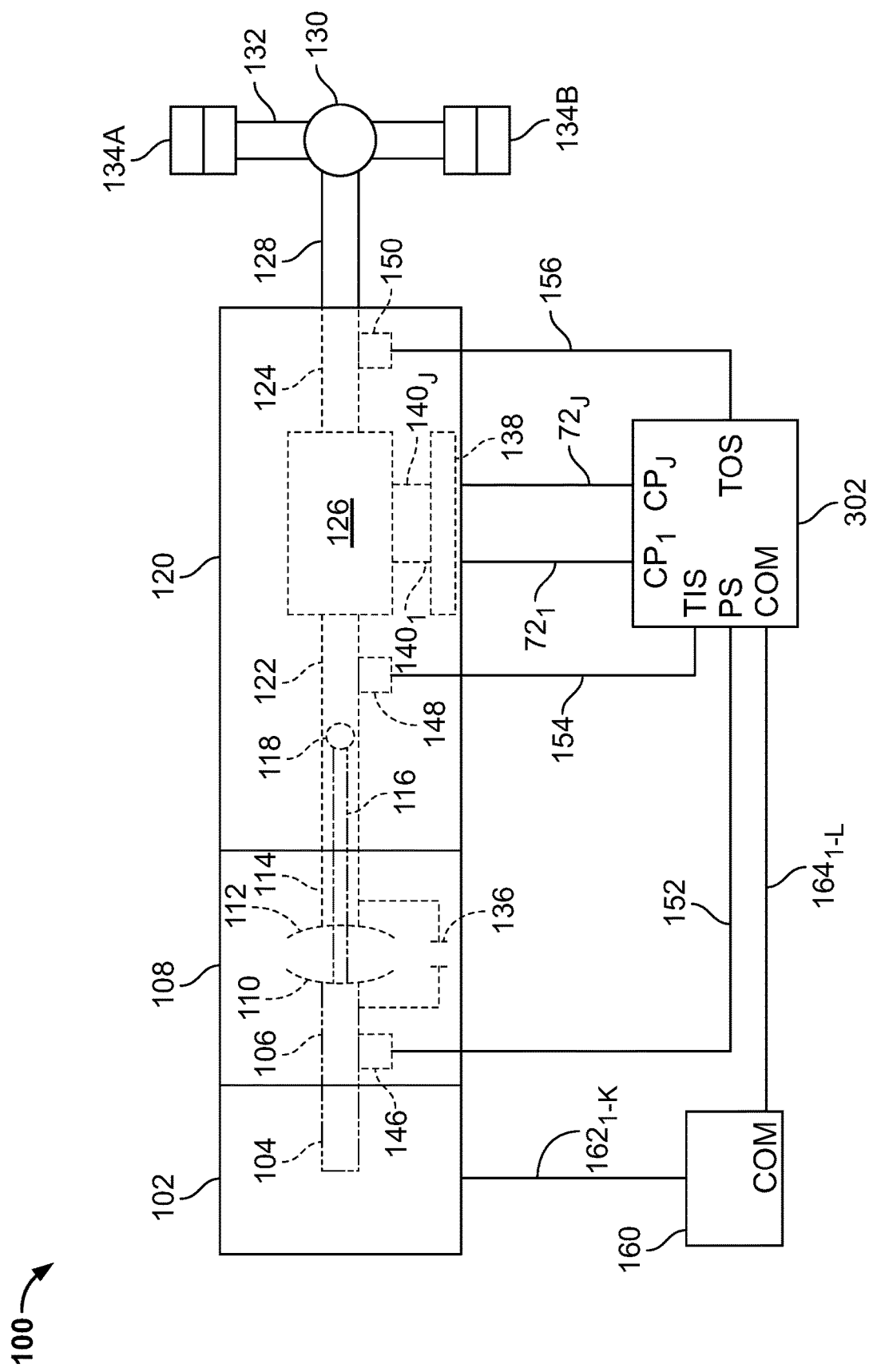
FIG. 1 is a diagrammatic view of a drive system for a vehicle.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

In the drawings, some structural or method features, such as those representing devices, modules, instructions blocks and data elements, may be shown in specific arrangements and/or orderings for ease of description. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

In some embodiments, schematic elements used to represent blocks of a method may be manually performed by a user. In other embodiments, implementation of those schematic elements may be automated using any suitable form of machine-readable instruction, such as software or firmware applications, programs, functions, modules, routines, processes, procedures, plug-ins, applets, widgets, code fragments and/or others, for example, and each such instruction may be implemented using any suitable programming language, library, application programming interface (API), and/or other software development tools. For instance, in some embodiments, the schematic elements may be implemented using Java, C++, and/or other programming languages. Similarly, schematic elements used to represent data or information may be implemented using any suitable electronic arrangement or structure, such as a register, data store, table, record, array, index, hash, map, tree, list, graph, file (of any file type), folder, directory, database, and/or others, for example.

Further, in the drawings, where connecting elements, such as solid or dashed lines or arrows, are used to illustrate a connection, relationship, or association between or among two or more other schematic elements, the absence of any such connection elements is not meant to imply that no connection, relationship, or association can exist. In other words, some connections, relationships, or associations between elements may not be shown in the drawings so as not to obscure the disclosure. In addition, for ease of illustration, a single connecting element may be used to represent multiple connections, relationships, or associations between elements. For example, where a connecting element represents a communication of signals, data or instructions, it should be understood by those skilled in the art that such element may represent one or multiple signal paths (e.g., a bus), as may be needed, to effect the communication.

Referring now to FIG. 1, an illustrative drive system 100 for a vehicle includes a transmission system 200 (see FIG. 2) that has a transmission 120 and a heat exchanger 204. The transmission 120 is configured to receive rotational power supplied by a drive unit 102 and provide the rotational power to a load (e.g., an axle 132 and wheels 134A, 134B mounted thereto) in use of the transmission system 200. The heat exchanger 204 is fluidly coupled to the transmission 120 and configured to cool a sump 222 of the transmission 120 to manage transmission oil temperature in use of the transmission system 200.

In the illustrative embodiment, the transmission 120 includes a control system 300 (see FIG. 3) that is configured to control operation of various components of the transmission 120 (e.g., one or more clutches, an electro-hydraulic system 138) and operation of a cooling system 202 that includes the heat exchanger 204. The control system 300 includes at least one sensor or sensing device (e.g., one or more of sensing device(s) 310, 312, 314 and fault diagnostic device(s) 316) configured to provide sensor data indicative of a state of a braking device of the vehicle or a fault state of the vehicle. Additionally, the control system 300 includes a controller 302 that is communicatively coupled to the at least one sensor or sensing device. As described in greater detail below with reference to FIGS. 5 and 6, the controller 302 includes a processor 304 and a memory device 306 coupled to the processor 304, and the memory device 306 has instructions stored therein that are executable by the processor 304 to cause the processor 304 to receive the sensor data from the at least one sensor and to control operation of the heat exchanger 204 to selectively cool the sump 222 by the heat exchanger 204 based on the sensor data to promote fuel economy in use of the transmission system 200.

It should be appreciated that control of the transmission 120 and the cooling system 202 by the illustrative control system 300, and other concepts of the present disclosure attendant to that control, selectively enables and disables cooling of the sump 222 by the heat exchanger 204 in certain vehicle operational states to promote fuel economy in a unique manner. In some embodiments, the control system 300 may disable cooling by the heat exchanger 204 during relatively high-load conditions, such as during acceleration of the vehicle, for example. Additionally, in some embodiments, the control system 300 may enable cooling by the heat exchanger 204 during relatively low-load conditions, such as during deceleration of the vehicle, for example. In doing so, the control system 300 may cool the sump 222 by the heat exchanger 204 so that the sump temperature reaches, or otherwise approaches, a target sump temperature value that corresponds to, or is otherwise associated with, a desired fuel economy of the vehicle.

Furthermore, it should be appreciated that control of the cooling system 202 by the illustrative control system 300, and other concepts of the present disclosure attendant to that control, facilitates diagnosis of faults (e.g., faults related to overheating of the sump 222) in a unique manner. In some embodiments, rather than logging a general fault code associated with the transmission 120 (e.g., overheating of the sump 222), the control system 300 may log or generate a fault code specific to the operation of one or more fans 206 of the heat exchanger 204, which may reduce troubleshooting time and cost. In addition, as will be apparent from the discussion that follows, at least in some embodiments, control of the cooling system 202 may be performed by the control system 300 without a sensing device associated with the heat exchanger 204 that monitors transmission oil temperature, thereby reducing cost.

Further still, it should be appreciated that the illustrative drive system 100 is adapted for use in one or more vehicles employed in a variety of applications. In some embodiments, the drive system 100 may be adapted for use with, or otherwise incorporated into, fire and emergency vehicles, refuse vehicles, coach vehicles, RVs and motorhomes, municipal and/or service vehicles, agricultural vehicles, mining vehicles, specialty vehicles, energy vehicles, defense vehicles, port service vehicles, construction vehicles, and transit and/or bus vehicles, just to name a few. Additionally, in some embodiments, the drive system 100 may be adapted for use with, or otherwise incorporated into, tractors, front end loaders, scraper systems, cutters and shredders, hay and forage equipment, planting equipment, seeding equipment, sprayers and applicators, tillage equipment, utility vehicles, mowers, dump trucks, backhoes, track loaders, crawler loaders, dozers, excavators, motor graders, skid steers, tractor loaders, wheel loaders, rakes, aerators, skidders, bunchers, forwarders, harvesters, swing machines, knuckleboom loaders, diesel engines, axles, planetary gear drives, pump drives, transmissions, generators, and marine engines, among other suitable equipment.

The illustrative transmission 120 has an input shaft 122, an output shaft 124, and one or more clutches (not shown).

The input shaft 122 is configured to receive rotational power supplied by the drive unit 102. The output shaft 124 is coupled to the input shaft 122 and configured to provide rotational power supplied to the input shaft 122 to the axle 132 and the wheels 134A, 134B mounted thereto. The one or more clutches may be included in, or otherwise adapted for use with, the electro-hydraulic system 138 and coupled between the input shaft 122 and the output shaft 124 to selectively transmit rotational power between the shafts 122, 124 in one or more operating modes of the transmission 120. Each of the one or more clutches may be selectively engageable in response to one or more fluid pressures applied thereto.

In the illustrative embodiment, the drive unit 102 is embodied as, or otherwise includes, any device capable of producing rotational power to drive other components (e.g., a torque converter 108 and the transmission 120) of the drive system 100 in use thereof. In some embodiments, the drive unit 102 may be embodied as, or otherwise include, an internal combustion engine, diesel engine, electric motor, or other power-generating device. In any case, the drive unit 102 is configured to rotatably drive an output shaft 104 that is coupled to an input or pump shaft 106 of a torque converter 108.

The input or pump shaft 106 of the illustrative torque converter 108 is coupled to an impeller or pump 110 that is rotatably driven by the output shaft 104 of the drive unit 102. The torque converter 108 further includes a turbine 112 that is coupled to a turbine shaft 114. In the illustrative embodiment, the turbine shaft 114 is coupled to, or integral with, the input shaft 122 of the transmission 120.

The illustrative torque converter 108 also includes a lockup clutch 136 connected between the pump 110 and the turbine 112 of the torque converter 108. The torque converter 108 is operable in a so-called "torque converter" mode during certain operating conditions, such as during vehicle launch, low speed conditions, and certain gear shifting conditions, for example. In the torque converter mode, the lockup clutch 136 is disengaged and the pump 110 rotates at the rotational speed of the drive unit output shaft 104 while the turbine 112 is rotatably actuated by the pump 110 through a fluid (not shown) interposed between the pump 110 and the turbine 112. In this operational mode, torque multiplication occurs through the fluid coupling such that the turbine shaft 114 is exposed to more torque than is being supplied by the drive unit 102. The torque converter 108 is alternatively operable in a so-called "lockup" mode during other operating conditions, such as when torque multiplication is not needed, for example. In the lockup mode, the lockup clutch 136 is engaged and the pump 110 is thereby secured directly to the turbine 112 so that the drive unit output shaft 104 is directly coupled to the input shaft 124 of the transmission 118 through the torque converter 108.

In the illustrative embodiment, the transmission 120 includes an internal pump 118 configured to pressurize, and/or distribute fluid toward, one or more fluid (e.g., hydraulic fluid) circuits thereof. In some embodiments, the pump 118 may be configured to pressurize, and/or distribute fluid toward, a main circuit, a lube circuit, an electro-hydraulic control circuit, and/or any other circuit incorporated into the electro-hydraulic system 138, for example. It should be appreciated that in some embodiments, the pump 118 may be driven by a shaft 116 that is coupled to the output shaft 104 of the drive unit 102. In this arrangement, the drive unit 102 can deliver torque to the shaft 116 for driving the pump 118 and building pressure within the different circuits of the transmission 120.

The illustrative transmission 120 includes a gearing system 126 coupled between the input shaft 122 and the output shaft 124. It should be appreciated that the gearing system 126 may include one or more gear arrangements (e.g., planetary gear arrangements, epicyclic drive arrangements, etc.) that provide, or are otherwise associated with, one or more gear ratios. When used in combination with the electro-hydraulic system 138 under control by the control system 300, the gearing system 126 may provide, or otherwise be associated with, one or more operating ranges selected by an operator.

The output shaft 124 of the transmission 120 is illustratively coupled to, or otherwise integral with, a propeller shaft 128. The propeller shaft 128 is coupled to a universal joint 130 which is coupled to, and rotatably drives, the axle 132 and the wheels 134A, 134B. In this arrangement, the output shaft 124 drives the wheels 134A, 134B through the propeller shaft 128, the universal joint 130, and the axle 132 in use of the drive system 100.

The illustrative transmission 120 includes the electro-hydraulic system 138 that is fluidly coupled to the gearing system 126 via a number (i.e., J) of fluid paths $140_1$-$140_J$, where J may be any positive integer. The electro-hydraulic system 138 is configured to receive control signals provided by various electro-hydraulic control devices (not shown), such as one or more sensors and one or more flow and/or pressure control devices, for example. In response to those control signals, and under control by the control system 300, the electro-hydraulic system 138 selectively causes fluid to flow through one or more of the fluid paths $140_1$-$140_J$ to control operation (e.g., engagement and disengagement) of one or more friction devices (e.g., the one or more clutches) included in, or otherwise adapted for use with, the gearing system 126.

Of course, it should be appreciated that the one or more friction devices may include, but are not limited to, one or more brake devices, one or more torque transmitting devices (i.e., clutches), and the like. Generally, the operation (e.g., engagement and disengagement) of the one or more friction devices is controlled by selectively controlling the friction applied by, or otherwise associated with, each of the one or more friction devices, such as by controlling fluid pressure applied to each of the friction devices, for example. In the illustrative embodiment, which is not intended to be limiting in any way, the electro-hydraulic system 138 may be coupled to, or otherwise adapted for use with, one or more brakes. Similar to the clutches, each of the one or more brakes may be controllably engaged and disengaged via fluid pressure supplied by the electro-hydraulic system 138. In any case, changing or shifting between the various gears of the transmission 120 is accomplished by selectively controlling the friction devices via control of fluid pressure within the number of fluid paths $140_1$-$140_J$.

In the illustrative system 100 shown in FIG. 1, the torque converter 108 and the transmission 120 include a number of sensors configured to produce sensor signals that are indicative of one or more operating states of the torque converter 108 and the transmission 120, respectively. For example, the torque converter 108 illustratively includes a speed sensor 146 that is configured to produce a speed signal corresponding to the rotational speed of the pump shaft 106, which rotates at the same speed as the output shaft 104 of the drive unit 102 in use of the drive system 100. The speed sensor 146 is electrically connected to a pump speed input (i.e., PS)

of the controller 302 via a signal path 152, and the controller 302 is operable to process the speed signal produced by the speed sensor 146 to determine the rotational speed of the pump shaft 106/drive unit output shaft 104.

In the illustrative system 100, the transmission 120 includes a speed sensor 148 that is configured to produce a speed signal corresponding to the rotational speed of the transmission input shaft 122, which rotates at the same speed as the turbine shaft 114 of the torque converter 108 in use of the system 100. The input shaft 122 of the transmission 120 may be directly coupled to, or otherwise integral with, the turbine shaft 114. Of course, it should be appreciated that the speed sensor 148 may alternatively be configured to produce a speed signal corresponding to the rotational speed of the turbine shaft 114. Regardless, the speed sensor 148 is electrically connected to a transmission input shaft speed input (i.e., TIS) of the controller 302 via a signal path 154, and the controller 302 is operable to process the speed signal produced by the speed sensor 148 to determine the rotational speed of the turbine shaft 114/transmission input shaft 124.

Further, in the illustrative system 100, the transmission 120 includes a speed sensor 150 that is configured to produce a speed signal corresponding to the rotational speed and direction of the output shaft 124 of the transmission 120. The speed sensor 150 is electrically connected to a transmission output shaft speed input (i.e., TOS) of the controller 302 via a signal path 156. The controller 302 is configured to process the speed signal produced by the speed sensor 150 to determine the rotational speed of the transmission output shaft 124.

In some embodiments, the electro-hydraulic system 138 includes one or more actuators configured to control various operations within the transmission 120. For example, the electro-hydraulic system 138 may include a number of actuators that are electrically connected to a number (i.e., J) of control outputs CP1-CPJ of the controller 302 via a corresponding number of signal paths 721-72J, where J may be any positive integer as described above. Each of the actuators may receive a corresponding one of the control signals CP1-CPJ produced by the controller 302 via one of the corresponding signal paths 721-72J. In response thereto, each of the actuators may control the friction applied by each of the friction devices by controlling the pressure of fluid within one or more corresponding fluid passageway 1401-140J, thereby controlling the operation of one or more corresponding friction devices based on information provided by the various speed sensors 146, 148, and/or 150 in use of the system 100.

In the illustrative embodiment, the system 100 includes a drive unit controller 160 having an input/output port (I/O) that is electrically coupled to the drive unit 102 via a number (i.e., K) of signal paths 162, wherein K may be any positive integer. The drive unit controller 160 is operable to control and manage the overall operation of the drive unit 102. The drive unit controller 160 includes a communication port (i.e., COM) which is electrically connected to a similar communication port (i.e., COM) of the controller 302 via a number (i.e., L) of signal paths 164, wherein L may be any positive integer. It should be appreciated that the one or more signal paths 164 may be referred to collectively as a data link. Generally, the drive unit controller 160 and the transmission controller 302 are operable to share information via the one or more signal paths 164. In one embodiment, for example, the drive unit controller 160 and the transmission controller 302 are operable to share information via the one or more signal paths 164 in the form of one or more messages in accordance with a Society of Automotive Engineers (SAE) J-1939 communications protocol. Of course, it should be appreciated that this disclosure contemplates other embodiments in which the drive unit controller 160 and the transmission controller 302 are operable to share information via the one or more signal paths 164 in accordance with one or more other communication protocols (e.g., from a conventional databus such as J1587 data bus, J1939 data bus, IESCAN data bus, GMLAN, Mercedes PT-CAN).

Figure 2:
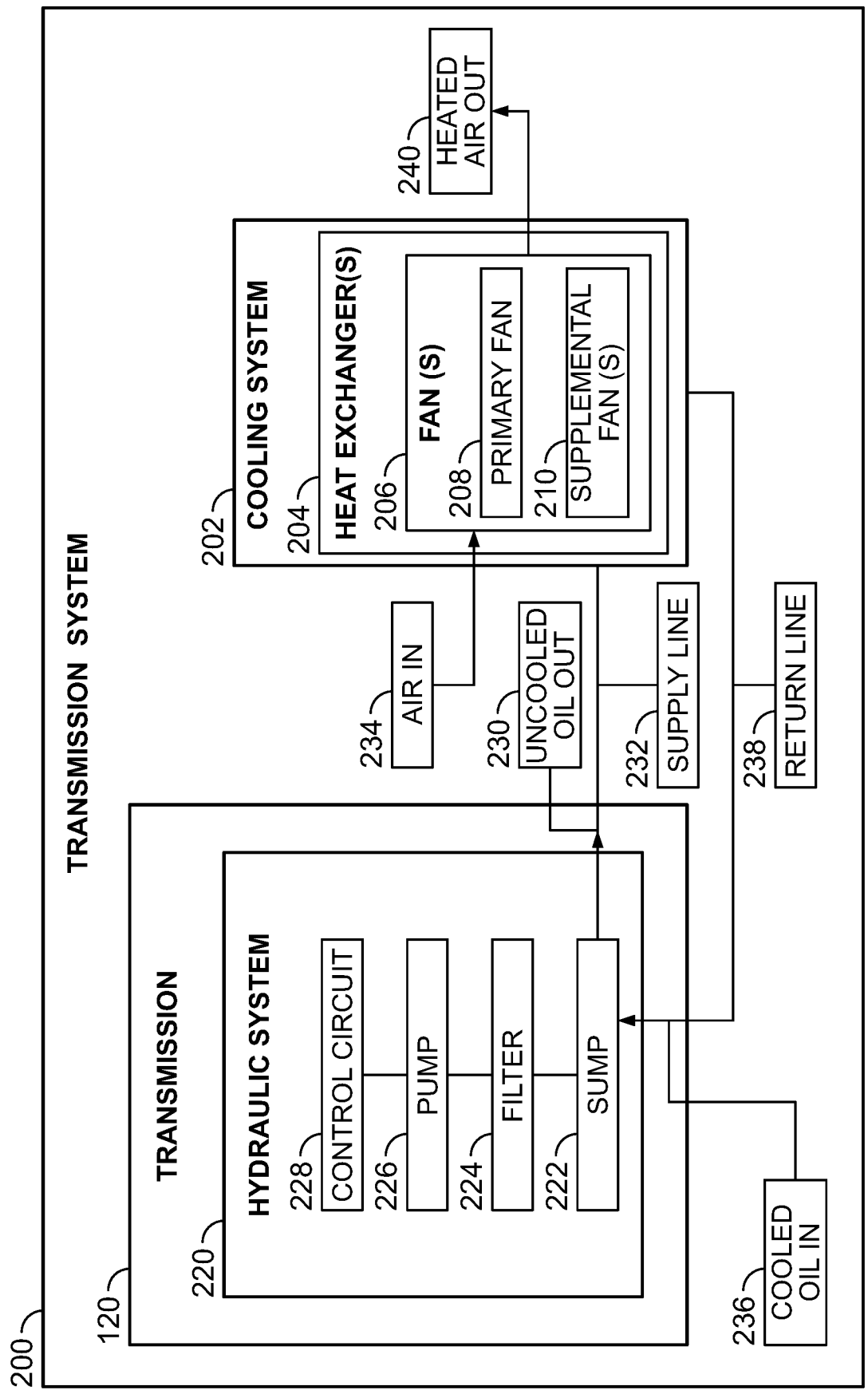
FIG. 2 is a diagrammatic view of a transmission system included in the drive system of FIG. 1.

Referring now to FIG. 2, the illustrative transmission 120 includes a hydraulic system 220 that has the sump 222, a filter 224, a pump 226, and a control circuit 228, among other things. The sump 222 is configured to store transmission oil for distribution to other components of the transmission 120. The filter 224 is configured to remove impurities, debris, and/or foreign matter from the transmission oil provided by the sump 222. The pump 226 is configured to drive distribution of filtered transmission oil provided by the sump 222 to other components of the transmission. The control circuit 228 is configured to control distribution of the oil provided by the sump 222, and to that end, the control circuit 228 may include, or otherwise be embodied as, one or more solenoid valves, trim valves, pressure control valves, accumulators, regulators, pressure orifice devices, restrictors, and/or the like.

The illustrative cooling system 202 includes the heat exchanger 204 which has, or is otherwise embodied as, multiple fans 206. In the illustrative embodiment, the fans 206 include a primary fan 208 and one or more supplemental fans 210. As described below in greater detail with reference to FIG. 10, at least in some embodiments, and based on instructions stored in the memory 306, the processor 304 is configured to selectively enable and disable cooling of the sump 222 by the primary fan 208 and the one or more supplemental fans 210 in use of the transmission system 200.

In the illustrative embodiment, the heat exchanger 204 is embodied as, or otherwise includes, an oil-to-air (OTA) heat exchanger. The heat exchanger 204 may be embodied as, or otherwise include, any device or collection of devices capable of transferring heat from the sump 222 to air drawn into the heat exchanger 204 to cool the sump 222 in use of the transmission system 200, as described below. For example, the heat exchanger 204 may incorporate, or otherwise be embodied as, a shell and tube heat exchanger, a plate heat exchanger, a shell and plate heat exchanger, an adiabatic wheel heat exchanger, a plate fin heat exchanger, a helical-coil heat exchanger, a spiral heat exchanger, a heat exchanger incorporating HVAC coils, or the like.

When the cooling system 202 cools the sump 222 in use of the transmission system 200, uncooled oil 230 is supplied to the heat exchanger 204 via a supply line 232 and air 234 is drawn into the heat exchanger 204 as a consequence of operation of the fans 206. Heat from the uncooled oil 230 is transferred to the air 234 to provide cooled oil 236 which is returned to the sump 222 via a return line 238. Heated air 240 is expelled from the heat exchanger 204.

Figure 3:
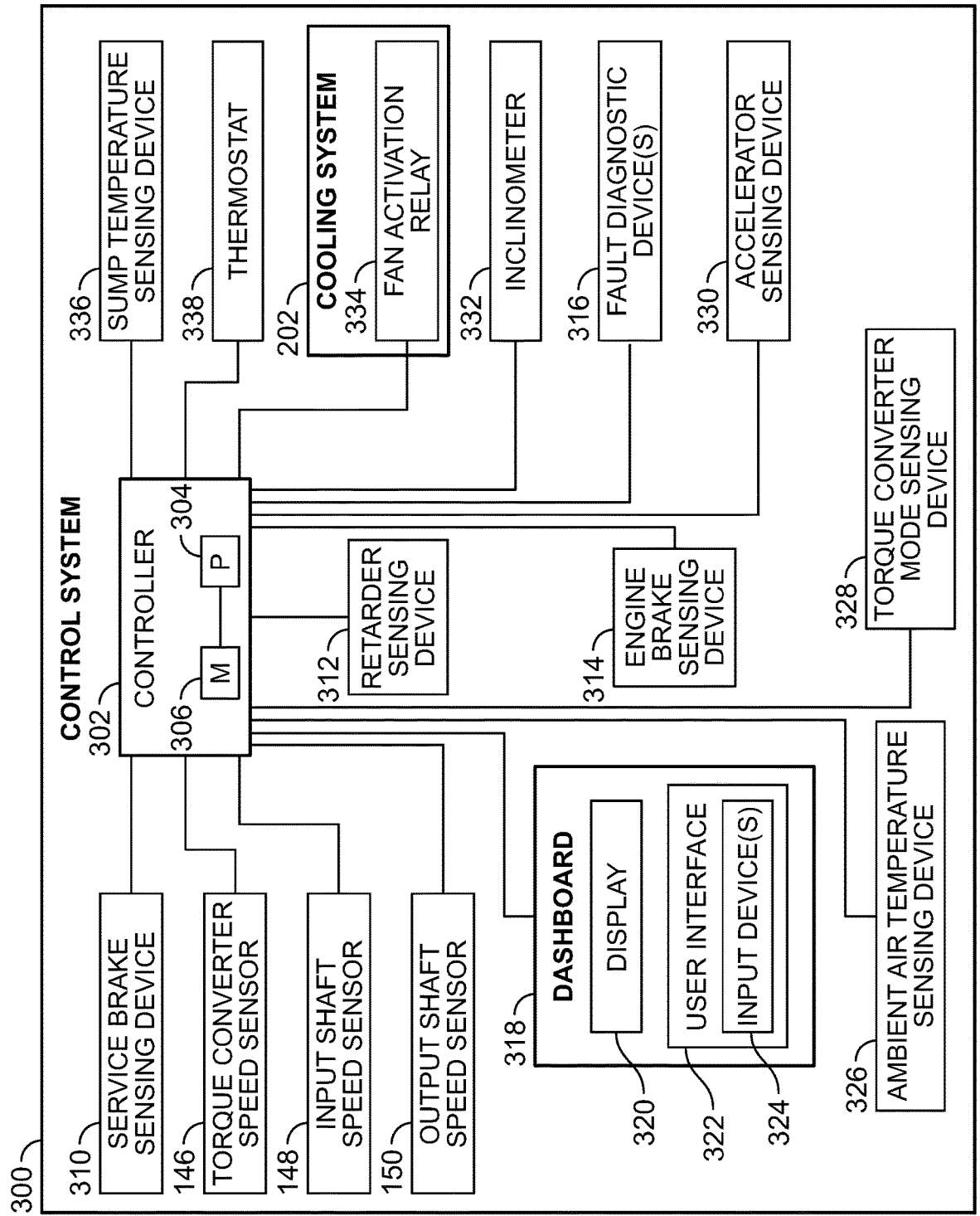
FIG. 3 is a diagrammatic view of a control system for the drive system of FIG. 1.

Referring now to FIG. 3, in the illustrative embodiment, the control system includes the sensors 146, 148, 150, the controller 302, the service brake sensing device 310, the retarder sensing device 312, the engine brake sensing device 314, the one or more fault diagnostic device(s) 316, a dashboard 318, an ambient air temperature sensing device 326, a torque converter mode sensing device 328, an accelerator sensing device 330, an inclinometer 332, a fan activation relay 334, a sump temperature sensing device 336, and a thermostat 338. Each of the devices 146, 148, 150, 310, 312, 314, 316, 318, 326, 328, 330, 332, 334, 336, 338 is communicatively coupled to the controller 302, such as by a direct (e.g., hardwired) connection or a controller area network (CAN) interface, for example.

The processor 304 of the illustrative controller 302 may be embodied as, or otherwise include, any type of processor, controller, or other compute circuit capable of performing various tasks such as compute functions and/or controlling the functions of the transmission 120, the cooling system 202, and, at least in some embodiments, the torque converter 108. For example, the processor 304 may be embodied as a single or multi-core processor(s), a microcontroller, or other processor or processing/controlling circuit. In some embodiments, the processor 304 may be embodied as, include, or otherwise be coupled to an FPGA, an application specific integrated circuit (ASIC), reconfigurable hardware or hardware circuitry, or other specialized hardware to facilitate performance of the functions described herein. Additionally, in some embodiments, the processor 304 may be embodied as, or otherwise include, a high-power processor, an accelerator co-processor, or a storage controller. In some embodiments still, the processor 304 may include more than one processor, controller, or compute circuit.

The memory device 306 of the illustrative controller 302 may be embodied as any type of volatile (e.g., dynamic random access memory (DRAM), etc.) or non-volatile memory capable of storing data therein. Volatile memory may be embodied as a storage medium that requires power to maintain the state of data stored by the medium. Non-limiting examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4 (these standards are available at www.jedec.org). Such standards (and similar standards) may be referred to as DDR-based standards and communication interfaces of the storage devices that implement such standards may be referred to as DDR-based interfaces.

In some embodiments, the memory device 306 may be embodied as a block addressable memory, such as those based on NAND or NOR technologies. The memory device 306 may also include future generation nonvolatile devices, such as a three dimensional crosspoint memory device (e.g., Intel 3D XPoint™ memory), or other byte addressable write-in-place nonvolatile memory devices. In some embodiments, the memory device 306 may be embodied as, or may otherwise include, chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product. In some embodiments, 3D crosspoint memory (e.g., Intel 3D XPoint™ memory) may comprise a transistor-less stackable cross point architecture in which memory cells sit at the intersection of word lines and bit lines and are individually addressable and in which bit storage is based on a change in bulk resistance.

The illustrative service brake sensing device 310 is embodied as, or otherwise includes, any device or collection of devices capable of detecting an operational characteristic of a service brake of the vehicle, such as depression (or lack thereof) of the service brake by an operator, engagement or activation, and/or disengagement or deactivation, for example. In some embodiments, the sensing device 310 may be embodied as, or otherwise include, a pressure sensor, a position sensor, or the like, for example. Of course, in other embodiments, it should be appreciated that the sensing device 310 may be embodied as, or otherwise include, another suitable device.

The illustrative retarder sensing device 312 is embodied as, or otherwise includes, any device or collection of devices capable of detecting an operational characteristic of a retarder of the vehicle, such as depression (or lack thereof) of the retarder by an operator, engagement or activation, and/or disengagement or deactivation, for example. In some embodiments, the sensing device 312 may be embodied as, or otherwise include, a pressure sensor, a position sensor, or the like, for example. Of course, in other embodiments, it should be appreciated that the sensing device 312 may be embodied as, or otherwise include, another suitable device.

It should be appreciated that in some configurations, the retarder may be installed as a component separate from the transmission 120, similar to the configuration of some Allison LCT series transmissions, for example. In such configurations, the retarder may be remotely installed and operated without being cooled by transmission oil (e.g., oil stored in the sump 222). Additionally, it should be appreciated that in some configurations, the retarded may optionally be included in the transmission 120, similar to the configuration of some Allison WT series transmissions, for example.

In the illustrative embodiment, the retarder is a braking device or system that is configured to convert the kinetic energy of the vehicle into thermal energy, which may heat the transmission oil stored in the sump 222. Of course, it should be appreciated that the retarder may be activated and/or de-activated by multiple mechanisms independently of, or in combination with, one another. In one example, the retarder may be activated in combination with the service brake of the vehicle. In another example, the retarder may be activated by a lever on the dashboard 318 independently of the service brake. In yet another example, the retarder may be activated by a cruise control device to maintain the cruise set speed in one or more operational conditions (e.g., vehicle travel downhill) independently of the service brake. In yet another example still, the retarder may be activated by an adaptive cruise control device to maintain the set distance between the front of the vehicle and a proximate object, such as another vehicle. Finally, the retarder may be activated to facilitate setup and/or operation of one or more speed limiting devices.

The illustrative engine brake sensing device 314 is embodied as, or otherwise includes, any device or collection of devices capable of detecting an operational characteristic of an engine brake of the vehicle, such as depression (or lack thereof) of the engine brake by an operator, engagement or activation, and/or disengagement or deactivation, for example. In some embodiments, the sensing device 314 may be embodied as, or otherwise include, a pressure sensor, a position sensor, or the like, for example. Of course, in other embodiments, it should be appreciated that the sensing device 314 may be embodied as, or otherwise include, another suitable device.

The illustrative one or more fault diagnostic device(s) 316 are each embodied as, or otherwise includes, any device or collection of devices capable of detecting a fault state of the vehicle, particularly a fault state related to operation of the transmission system 200, such as an overheating fault associated with the transmission 120 and/or the cooling system 202, for example. In some embodiments, the diagnostic device(s) 316 may each be embodied as, or otherwise include, a temperature sensor, a pressure sensor, a position sensor, or the like, for example. Of course, in other embodiments, it should be appreciated that each of the diagnostic device(s) 316 may be embodied as, or otherwise include, another suitable device.

The dashboard 318 of the illustrative control system 300 includes a display 320 and a user interface 322. The display 320 is configured to output or display various indications, messages, and/or prompts to an operator, which may be generated by the control system 300. The user interface 322 is configured to provide various inputs to the control system 300 based on various actions, which may include actions performed by an operator. To that end, the user interface 322 includes one or more input devices 324.

The illustrative ambient air temperature sensing device 326 is embodied as, or otherwise includes, any device or collection of devices capable of detecting ambient air temperature. In some embodiments, the sensing device 326 may be embodied as, or otherwise include, a temperature sensor, a humidity sensor, or the like, for example. Of course, in other embodiments, it should be appreciated that the sensing device 326 may be embodied as, or otherwise include, another suitable device.

The illustrative torque converter mode sensing device 328 is embodied as, or otherwise includes, any device or collection of devices capable of detecting an operational characteristic of the torque converter 108, such as operation of the torque converter 108 in a lockup mode (in which the lockup clutch 136 is engaged) and in a converter mode (in which the lockup clutch 136 is disengaged), for example. In some embodiments, the sensing device 328 may be embodied as, or otherwise include, a pressure sensor, a temperature sensor, a position sensor, or the like, for example. Of course, in other embodiments, it should be appreciated that the sensing device 328 may be embodied as, or otherwise include, another suitable device.

The illustrative accelerator sensing device 330 is embodied as, or otherwise includes, any device or collection of devices capable of detecting an operational characteristic of an accelerator or throttle of the vehicle, such as depression (or lack thereof) of the accelerator by an operator, engagement or activation, and/or disengagement or deactivation, for example. In some embodiments, the sensing device 330 may be embodied as, or otherwise include, a pressure sensor, a position sensor, or the like, for example. Of course, in other embodiments, it should be appreciated that the sensing device 330 may be embodied as, or otherwise include, another suitable device.

The inclinometer 332 is embodied as, or otherwise includes, any device or collection of devices capable of detecting a grade of a surface on which the vehicle carrying the transmission system 200 is positioned. In some embodiments, the inclinometer 332 may be embodied as, or otherwise include, a tilt sensor, a level gauge, a gradient meter, or the like, for example. Of course, in other embodiments, it should be appreciated that the inclinometer 332 may be embodied as, or otherwise include, another suitable device.

The fan activation relay 334, which is included in the cooling system 202, is embodied as, or otherwise includes, any device or collection of devices capable of selectively activating (e.g., selectively providing electrical energy to) one or more electrically powered components of the heat exchanger 204 (e.g., the fans 206) to drive operation thereof. In some embodiments, the fan activation relay 334 may be embodied as, or otherwise include, a switch, a contactor, a solid-state relay, a protective relay, or the like, for example. Of course, in other embodiments, it should be appreciated that the relay 334 may be embodied as, or otherwise include, another suitable device.

The illustrative sump temperature sensing device 336 is embodied as, or otherwise includes, any device or collection of devices capable of sensing the temperature of the sump 222. In some embodiments, the sensing device 336 may be embodied as, or otherwise include, a temperature sensor, a humidity sensor, or the like, for example. Of course, in other embodiments, it should be appreciated that the sensing device 336 may be embodied as, or otherwise include, another suitable device.

The illustrative thermostat 338 is embodied as, or otherwise includes, any device or collection of devices capable of sensing and/or adjusting the temperature of the sump 222 toward a target value to reduce the difference between a sensed or measured temperature and a desired temperature. In some embodiments, the thermostat 338 may be included in, integrated with, or otherwise form a portion of, the controller 302. In such embodiments, the thermostat 338 may be configured to at least partially perform the functions, methods, and/or activities described below to manage the temperature of the sump 222 in use of the transmission system 200. Additionally, in some embodiments, the thermostat 338 may be included in place of, or as an alternative to, the sump temperature sensing device 336.

In some embodiments, the devices 146, 148, 150, 310, 312, 314, 316, 324, 326, 328, 330, 332, 336 may be embodied as, or otherwise include, input devices configured to provide input data and/or signals to the controller 302. Additionally, in some embodiments, the fan activation relay 334 and the thermostat 338 may be embodied as, or otherwise include, output devices configured to receive output data and/or signals provided by the controller 302 in response to the input data and/or signals.

Figure 4:
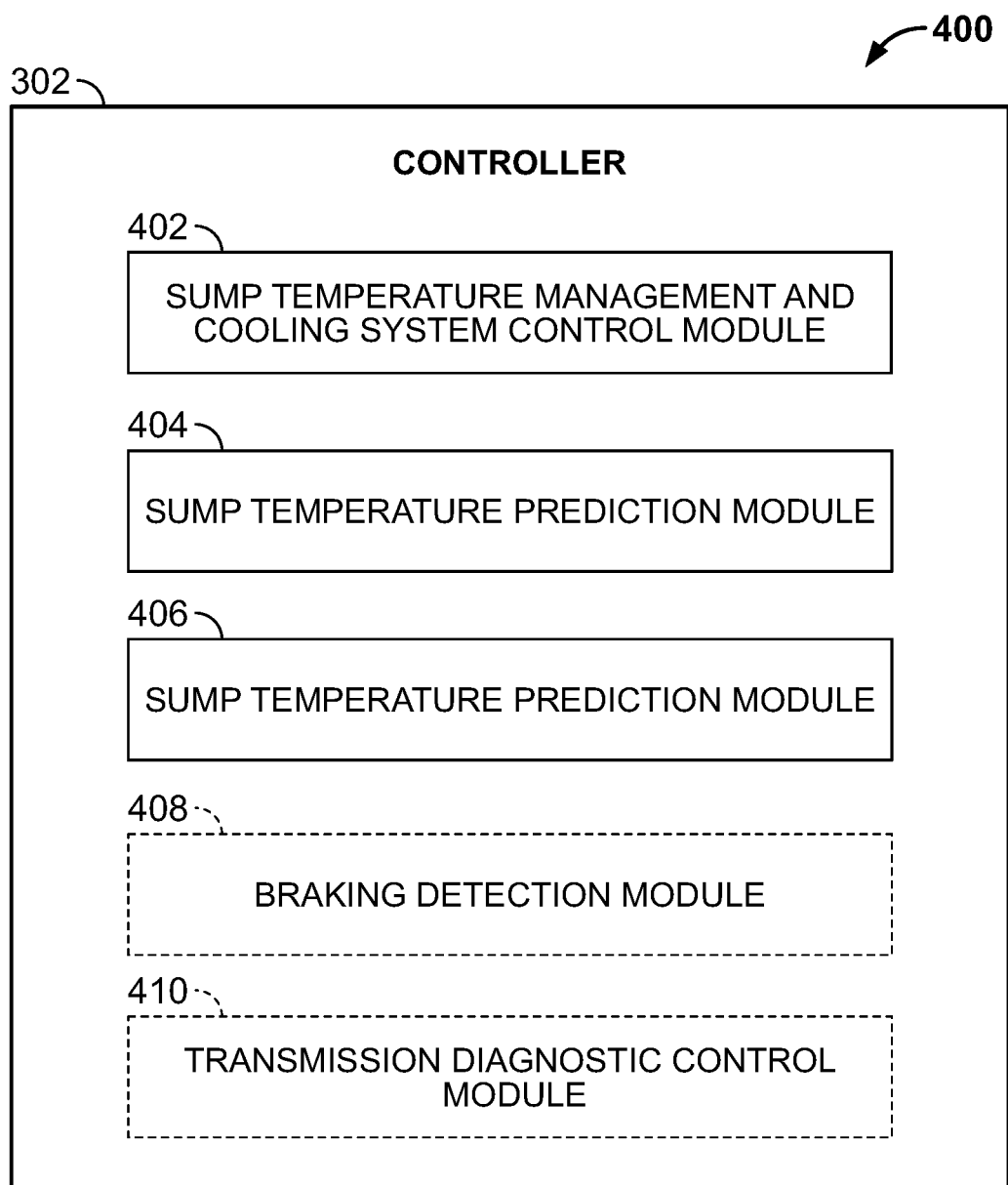
FIG. 4 is a diagrammatic view of a number of modules that may be included in a controller of the control system shown in FIG. 3.

Referring now to FIG. 4, in the illustrative embodiment, the controller 302 establishes an environment 400 during operation. The illustrative environment 400 includes a sump temperature management and cooling system control module 402, a sump temperature prediction module 404, and a sump temperature prediction module 406. Additionally, in some embodiments, the environment 400 may include a braking detection module 408 and a transmission diagnostic control module 410.

Each of the modules, logic, and other components of the environment 400 may be embodied as hardware, firmware, software, or a combination thereof. As such, in some embodiments, one or more modules of the environment 400 may be embodied as circuitry or a collection of electrical devices. In such embodiments, one or more of the sump temperature management and cooling system control module 402, the sump temperature prediction module 404, the sump temperature prediction module 406, the braking detection module 408, and the transmission diagnostic control module 410 may form a portion of the processor(s) 304 and/or other components of the controller 302. Additionally, in some embodiments, one or more of the illustrative modules may form a portion of another module and/or one or more of the illustrative modules may be independent of one another. Further, in some embodiments, one or more of the modules of the environment 400 may be embodied as virtualized hardware components or emulated architecture, which may be established and maintained by the processor(s) 304 or other components of the controller 302.

The sump temperature management and cooling system control module 402, which may be embodied as hardware, firmware, software, virtualized hardware, emulated architecture, and/or a combination thereof as discussed above, is configured to receive input data from one or more input devices and manage the temperature of the sump 222 in use of the transmission system 200 based at least partially on the input data and a predicted temperature of the sump 222. To do so, in the illustrative embodiment, the sump temperature management and cooling system control module 402 may perform the methods described below with reference to FIGS. 5 and 6.

The sump temperature prediction module 404, which may be embodied as hardware, firmware, software, virtualized hardware, emulated architecture, and/or a combination thereof as discussed above, is configured to predict the temperature of the sump 222 in use of the transmission system 200. To do so, in the illustrative embodiment, the sump temperature prediction module 404 may perform the prediction scheme described below in greater detail with reference to FIGS. 6A and 6B.

The sump temperature prediction module 406, which may be embodied as hardware, firmware, software, virtualized hardware, emulated architecture, and/or a combination thereof as discussed above, is configured to predict the temperature of the sump 222 in use of the transmission system 200. To do so, in the illustrative embodiment, the sump temperature prediction module 406 may perform the prediction scheme described below in greater detail with reference to FIGS. 6A and 6B.

The braking detection module 408, which may be embodied as hardware, firmware, software, virtualized hardware, emulated architecture, and/or a combination thereof as discussed above, may be configured to receive and/or process input indicative of a state of one or more braking devices of the vehicle, such as input provided by the service brake sensing device 310, the retarder sensing device 312, and the engine brake sensing device 314, for example. Based at least partially on the input received and/or processed by the braking detection module 408, the controller 302 may selectively enable or disable cooling of the sump 222 by the heat exchanger 204 as described below in greater detail with reference to FIG. 8.

The transmission diagnostic control module 410, which may be embodied as hardware, firmware, software, virtualized hardware, emulated architecture, and/or a combination thereof as discussed above, may be configured to receive and/or process input indicative of a fault state of the vehicle, such as input provided by the one or more fault diagnostic device(s) 316, for example. Based at least partially on the input received and/or processed by the transmission diagnostic control module 410, the controller 302 may selectively enable or disable cooling of the sump 222 by the heat exchanger 204 as described below in greater detail with reference to FIG. 8.

Figure 5:
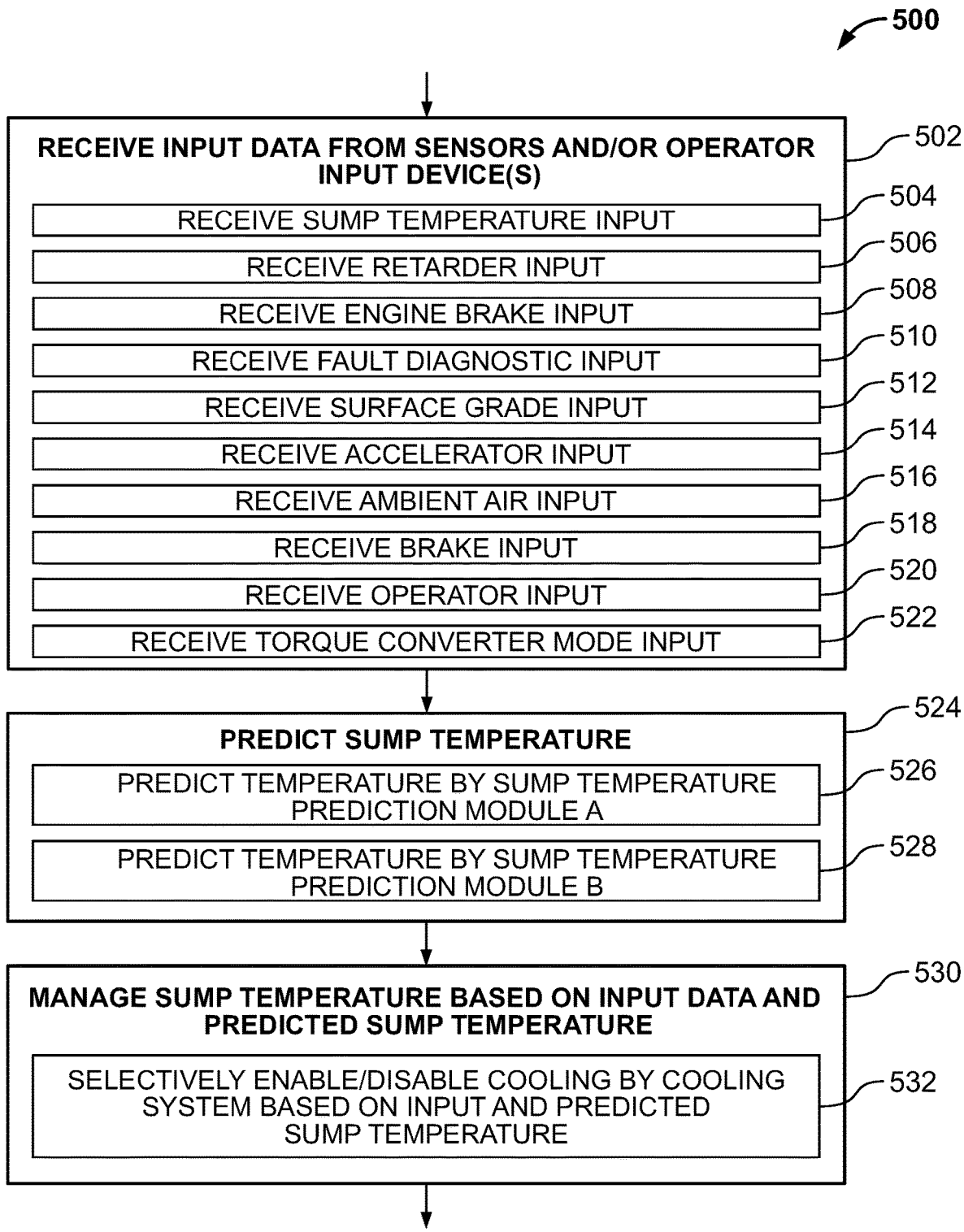
FIG. 5 is a simplified flowchart of a method that may be performed by a sump temperature management and cooling system control module in conjunction with performance of a prediction scheme by one of two sump temperature prediction modules of the controller diagrammatically depicted in FIG. 4.

Referring now to FIG. 5, an illustrative method 500 of operating the transmission system 200 may be embodied as, or otherwise include, a set of instructions that are executable by the control system 300 (i.e., the sump temperature management and cooling system control module 402 in conjunction with at least one of the sump temperature prediction modules 404, 406). The method 500 corresponds to, or is otherwise associated with, performance of the blocks described below in the illustrative sequence of FIG. 5. It should be appreciated, however, that the method 500 may be performed in one or more sequences different from the illustrative sequence.

The illustrative method 500 begins with block 502. In block 502, the controller 302 receives input data from the devices described above with reference to FIG. 3. To perform block 502, the controller 302 performs blocks 504, 506, 508, 510, 512, 514, 516, 518, 520, 522 described below.

In block 504 of the illustrative method 500, the controller 302 receives input data indicative of a measured temperature of the sump 222 in use of the transmission system 200. That is, in block 504, the controller 302 receives temperature input data from the sump temperature sensing device 336.

In block 506 of the illustrative method 500, the controller 302 receives input data indicative of a state of the retarder of the vehicle in use of the transmission system 200. That is, in block 506, the controller 302 receives retarder input data from the retarder sensing device 312.

In block 508 of the illustrative method 500, the controller 302 receives input data indicative of a state of the engine brake of the vehicle in use of the transmission system 200. That is, in block 508, the controller 302 receives engine brake input data from the engine brake sensing device 314.

In block 510 of the illustrative method 500, the controller 302 receives input data indicative of a fault state of the vehicle in use of the transmission system 200. That is, in block 510, the controller 302 receives fault diagnostic input data from the one or more fault diagnostic device(s) 316.

In block 512 of the illustrative method 500, the controller 302 receives input data indicative of a grade of the surface on which the vehicle is positioned in use of the transmission system 200. That is, in block 512, the controller 302 receives surface grade input data from the inclinometer 332.

In block 514 of the illustrative method 500, the controller 302 receives input data indicative of a state of the accelerator in use of the transmission system 200. That is, in block 514, the controller 302 receives accelerator input data from the accelerator sensing device 330.

In block 516 of the illustrative method 500, the controller 302 receives input data indicative of the ambient air temperature in use of the transmission system 200. That is, in block 516, the controller 302 receives ambient air temperature input data from the ambient air temperature sensing device 326.

In block 518 of the illustrative method 500, the controller 302 receives input data indicative of a state of the service brake of the vehicle in use of the transmission system 200. That is, in block 518, the controller 302 receives service brake input data from the service brake sensing device 310.

In block 520 of the illustrative method 500, the controller 302 receives input data provided by the operator in use of the transmission system 200. That is, in block 520, the controller 302 receives operator input data from the input device(s) 324.

In block 522 of the illustrative method 500, the controller 302 receives input data indicative of a current operational mode of the torque converter 108 in use of the transmission system 200. That is, in block 522, the controller 302 receives torque converter mode input data from the torque converter mode sensing device 528.

From block 502, the illustrative method 500 subsequently proceeds to block 524. In block 524, the controller 302 predicts the temperature of the sump 222. To do so, in the illustrative embodiment, the controller 302 performs at least one of blocks 526, 528. In block 526, the controller 302 (i.e., the sump temperature prediction module 404) predicts the temperature of the sump 222 as described in greater detail below with reference to FIGS. 6A and 6B. In block 528, the controller 302 (i.e., the sump temperature prediction module 406) predicts the temperature of the sump 222 as described in greater detail below with reference to FIGS. 6A and 6B.

From block 524, the illustrative method 500 subsequently proceeds to block 530. In block 530, the controller 302 manages the temperature of the sump 222 based on the input data received in block 502 and the sump temperature predicted in block 524. To do so, the controller 302 performs block 532. In block 532, the controller 302 selectively enables and disables cooling of the sump 222 by the cooling system 202 based on the input data received in block 502 and the sump temperature predicted in block 524.

Figure 6A:
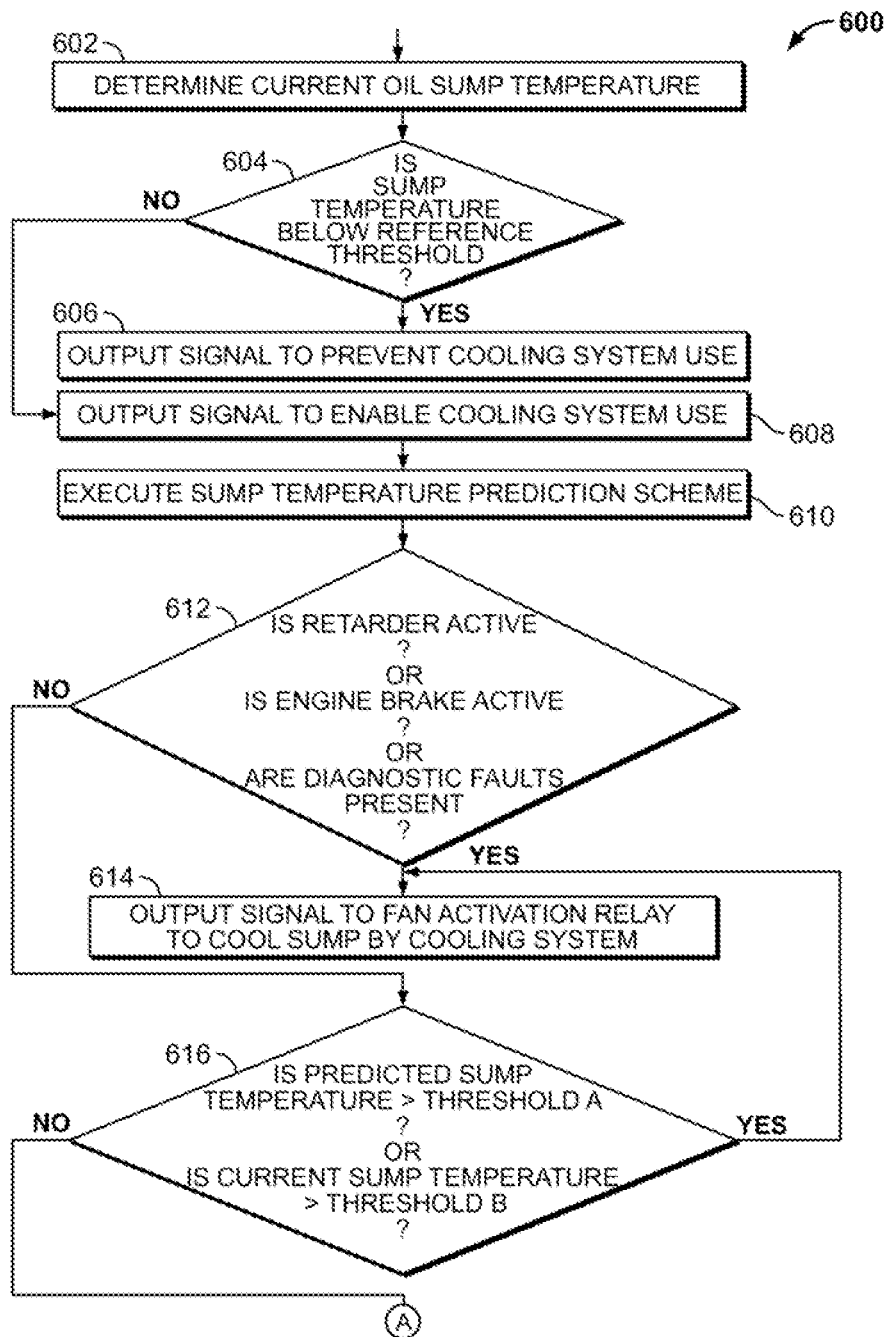
FIG. 6A is a simplified flowchart of a portion of another method that may be performed by the sump temperature management and cooling system control module in conjunction with performance of a prediction scheme by one of two sump temperature prediction modules of the controller diagrammatically depicted in FIG. 4.
Figure 6B:
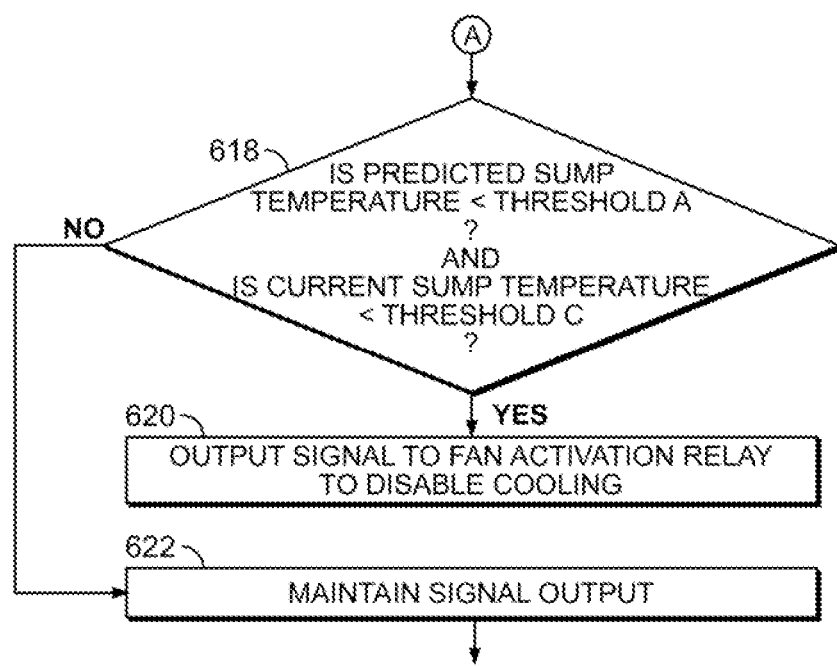
FIG. 6B is a simplified flowchart of another portion of the method of FIG. 6A.

Referring now to FIGS. 6A and 6B, an illustrative method 600 of operating the transmission system 200 may be embodied as, or otherwise include, a set of instructions that are executable by the control system 300 (i.e., the sump temperature management and cooling system control module 402 in conjunction with at least one of the sump temperature prediction modules 404, 406). The method 600 corresponds to, or is otherwise associated with, performance of the blocks described below in the illustrative sequence of FIGS. 6A and 6B. It should be appreciated, however, that the method 600 may be performed in one or more sequences different from the illustrative sequence.

The illustrative method 600 begins with block 602. In block 602, the controller 302 determines the current temperature of the sump 222 based on the temperature input data provided by the sump temperature sensing device 336. From block 602, the method 600 subsequently proceeds to block 604.

In block 604 of the illustrative method 600, the controller 302 determines whether the measured temperature of the sump 222 is below a reference threshold. It should be appreciated that in at least some embodiments, the reference threshold may correspond to, or otherwise be associated with, a low temperature value substantially below an acceptable operating temperature for transmission oil stored in the sump 222. In some embodiments, the reference threshold may be approximately 20 degrees Celsius. In response to a determination by the controller 302 that the measured temperature of the sump 222 is below the reference threshold, the method 600 subsequently proceeds to block 606.

In block 606 of the illustrative method 600, the controller 302 outputs a signal to prevent use of the cooling system 202 to cool the sump 222. To do so, the controller 302 may output a signal to an output device (e.g., at least one of the fan activation relay 334 and the thermostat 338) to disable cooling of the sump 222 by the heat exchanger 204.

Returning to block 604, if the controller 302 determines in block 604 that the measured temperature of the sump 222 is not below the reference threshold, the method 600 subsequently proceeds to block 608. In block 608, the controller 302 outputs a signal to enable use of the cooling system 202 to cool the sump 222. To do so, the controller 302 may output a signal to an output device (e.g., at least one of the fan activation relay 334 and the thermostat 338) to enable cooling of the sump 222 by the heat exchanger 204. In any case, from block 608, the method 600 subsequently proceeds to block 610.

In block 610 of the illustrative method 600, the controller 302 (e.g., at least one of the sump temperature prediction modules 404, 406) executes a sump temperature prediction scheme. To do so, in the illustrative embodiment, the controller 302 predicts a temperature $T_{predict}$ in the sump 222 based on a current sump temperature $T_n$ (i.e., as measured by the sump temperature sensing device 336), a predicted rate of change in sump temperature $\Delta_{temp}$ (which may be referred to as the gradient of the measured sump temperature), and a prediction time interval $t_{horizon}$. More specifically, the controller 302 predicts the temperature $T_{predict}$ in the sump 222 according to the following equation:

$$T_{predict}=T_n+(\Delta_{temp}*t_{horizon}) \quad (1)$$

Additionally, in block 610 of the illustrative method 600, the controller 302 predicts the rate of change in sump temperature $\Delta_{temp}$ based on a previous predicted rate of change of sump temperature ($\Delta_{temp\_previous}$), the current sump temperature sample value ($T_n$), a previous sump temperature sample value ($T_{n-1}$), a time measurement rate ($t_{measurement\_rate}$), and a constant reference value ($K_{filter}$). More specifically, the controller 302 predicts the rate of change in sump temperature $\Delta_{temp}$ according to the following equation:

$$\Delta_{temp}=\Delta_{temp\_previous}+([T_n-T_{n-1}]/t_{measurement\_rate}-\Delta_{temp\_previous})/K_{filter} \quad (2)$$

Further, in block 610 of the illustrative method 600, at least in some embodiments, the prediction time interval $t_{horizon}$ may correspond to, or otherwise be associated with, one or more thirty second intervals. Additionally, in block 610, the current sump temperature sample value ($T_n$) and the previous sump temperature sample value ($T_{n-1}$) may be determined by the controller 302 over one or more one second time intervals. It should be appreciated that the previous predicted rate of change of sump temperature ($\Delta_{temp\_previous}$) corresponds to, or is otherwise associated with, a previously executed iteration of the illustrative scheme for predicting the rate of change of sump temperature $\Delta_{temp}$ by the controller 302.

Further still, in block 610 of the illustrative method 600, at least in some embodiments, the reference value ($K_{filter}$) is determined by the controller 302 based on ambient air temperature data (i.e., temperature input data provided by the ambient air temperature sensing device 326) and based on torque converter mode sensor data (i.e., mode data provided by the torque converter mode sensing device 328) and/or retarder input data (i.e., input data provided by the retarder sensing device 312). In some embodiments, one or more control schemes or algorithms may be executed by the controller 302 to establish a relationship between the ambient air temperature data and the mode data associated with the torque converter 108 and/or the input data associated with the retarder. Based on that relationship, one or more lookup tables may be generated and stored in the memory device 306 to define a range of constant reference values ($K_{filter}$). Therefore, each executed iteration of the illustrative scheme for predicting the rate of change of sump temperature $\Delta_{temp}$ may include, or otherwise be embodied as, a determination of the constant reference value ($K_{filter}$) by the controller 302 based on information contained in one or more lookup tables. In some embodiments (e.g., when the torque converter 108 is determined to be on or active based on the input data provided by the sensing device 328), the constant reference value ($K_{filter}$) may include, or otherwise be embodied as, a programmable value that is established based on one or more operational characteristics of the torque converter 108. Additionally, in some embodiments (e.g., when the retarder is determined to be on or active based on the input data provided by the sensing device 312), the constant reference value ($K_{filter}$) may include, or otherwise be embodied as, a programmable value that is established based on one or more operational characteristics of the retarder. In some embodiments still, the constant reference value ($K_{filter}$) may include, or otherwise be embodied as, a calibrated value established by the user during execution of the illustrative scheme for predicting the rate of change of sump temperature $\Delta_{temp}$ that is based on the state of the retarder (i.e., as indicated by the sensing device 312) and the state of the torque converter 108 (i.e., as indicated by the sensing device 328).

Subsequent to the prediction of temperature $T_{predict}$ in block 610, the illustrative method 600 proceeds to block 612. In block 612, the controller 302 makes multiple determinations. First, the controller 302 determines, based on the input data received in block 502, whether the retarder is active based on the input provided by the retarder sensing device 312. Second, the controller 302 determines whether the engine brake is active based on the input provided by the engine brake sensing device 314 in block 502. Third, the controller 302 determines whether a fault state of the vehicle is present based on the input provided by the one or more fault diagnostic device(s) 316 in block 502. If the controller 302 determines in block 612 that the retarder is active, that the engine brake is active, or that a fault is present, the method 600 subsequently proceeds to block 614. It should be appreciated that a determination in block 612 that the retarder is active, that the engine brake is active, or that a fault is present may coincide with, or otherwise represent, a determination of a heat-generating event associated with the transmission system 200 (e.g., the transmission 120) for which cooling is desired, as described below.

In block 614 of the illustrative method 600, the controller 302 outputs a signal to cool the sump 222 by the cooling system 202. To do so, the controller 302 may output a signal to an output device (e.g., at least one of the fan activation relay 334 and the thermostat 338) to cool the sump 222 using the heat exchanger 204.

Returning to block 612 of the illustrative method 600, if the controller 302 determines in block 612 that the retarder is inactive, that the engine brake is inactive, and that a fault is not present, the method 600 subsequently proceeds to block 616. In block 616, the controller 302 determines whether the predicted temperature $T_{predict}$ of the sump 222 is greater than a first temperature threshold. Additionally, in block 616, the controller 302 determines whether the current measured temperature of the sump 222 $T_{current}$ is greater than a second temperature threshold. At least in some embodiments, the first temperature threshold may correspond to, or otherwise be associated with, a predicted temperature limit of about 121° Celsius. Additionally, in at least some embodiments, the second temperature threshold may correspond to, or otherwise be associated with, a temperature of about 115° Celsius. In any case, if the controller 302 determines in block 616 that the predicted temperature $T_{predict}$ of the sump 222 is greater than a first temperature threshold or that the current measured temperature of the sump 222 $T_{current}$ is greater than a second temperature threshold, the method 600 subsequently proceeds to block 614 in which the controller 302 cools the sump 222 by the heat exchanger 204.

If the controller 302 determines in block 616 that the predicted temperature $T_{predict}$ of the sump 222 is not greater than a first temperature threshold and that the current measured temperature of the sump 222 $T_{current}$ is not greater than a second temperature threshold, the method 600 subsequently proceeds to block 618. In block 618, the controller 302 determines whether the predicted temperature $T_{predict}$ of the sump 222 is less than the first temperature threshold and whether the current measured temperature of the sump 222 $T_{current}$ is less than a third temperature threshold. At least in some embodiments, the third temperature threshold may correspond to, or otherwise be associated with, a temperature of about 110° Celsius. In any case, if the controller 302 determines in block 616 that the predicted temperature $T_{predict}$ of the sump 222 is less than the first temperature threshold and that the current measured temperature of the sump 222 $T_{current}$ is less than a third temperature threshold, the method 600 subsequently proceeds to block 620.

In block 620 of the illustrative method 600, the controller 302 outputs a signal to disable cooling of the sump 222 by the cooling system 202. To do so, the controller 302 may output a signal to an output device (e.g., at least one of the fan activation relay 334 and the thermostat 338) to disable cooling of the sump 222 by the heat exchanger 204.

Returning to block 618 of the illustrative method 600, if the controller 302 determines in block 618 that the predicted temperature $T_{predict}$ of the sump 222 is not less than the first temperature threshold and that the current measured temperature of the sump 222 $T_{current}$ is not less than the third temperature threshold, the method 600 subsequently proceeds to block 622. In block 622, the controller 302 maintains the output signal to one or more of the output devices to maintain the previous states of the output devices.

Referring now to FIG. 7, a table 700 depicts possible states of various devices during performance of the method 600 as described above. In the illustrative table 700, column 702 depicts previous states of output devices, column 708 depicts states of various input devices, and column 720 depicts next (i.e., determined with reference to previous) states of output devices. In the illustrative table 700, column 702 includes sub-columns 704 and 706, which correspond to previous states associated with the fan activation relay 344 and the thermostat 338, respectively. Column 708 includes sub-columns 710, 712, 714, 716, 718. Sub-column 710 corresponds to the determinations made in block 612 of the method 600, sub-column 712 corresponds to the determination made in block 604 of the method 600, sub-columns 714 and 716 correspond to the determinations made in block 616 of the method 600, and sub-column 718 corresponds to the determinations made in block 618 of the method 600. Column 720 includes sub-columns 722 and 724, which correspond to next states associated with the thermostat 338 and the fan activation relay 344, respectively.

In row 726 of the illustrative table 700, presuming a previous output state of the thermostat 338 to be off or inactive (i.e., as indicated in column 706), a determination is made by the controller 302 in block 604 (i.e., as indicated by column 712) that the current measured temperature of the sump 222 $T_{current}$ is less than the reference threshold. As a result, a signal is output to the thermostat 338 to turn on or activate the thermostat (i.e., as indicated by column 722) and deactivate the cooling system 202 (i.e., as indicated by column 724 and block 606).

In row 728 of the illustrative table 700, presuming a previous output state of the thermostat 338 to be on or active (i.e., as indicated in column 706), a determination is made by the controller 302 in block 604 (i.e., as indicated by column 712) that the current measured temperature of the sump 222 $T_{current}$ is less than the reference threshold. As a result, a signal is output to the thermostat 338 to turn on or activate the thermostat 338 (i.e., as indicated by column 722) and deactivate the cooling system 202 via the fan activation relay 334 (i.e., as indicated by column 724 and block 606).

In row 730 of the illustrative table 700, presuming a previous output state of the thermostat 338 to be off or inactive (i.e., as indicated by column 706) and a previous output state of the fan activation relay 334 to be off or inactive (i.e., as indicated by column 704), and presuming a determination that the current measured temperature of the sump 222 $T_{current}$ is not less than the reference threshold (i.e., as indicated in column 712), a determination is made by the controller 302 in block 612 (i.e., as indicated by column 710) that the retarder is active, that the engine brake is active, or that a fault state is present. As a result, a signal is output to the fan activation relay 334 to turn on or activate the heat exchanger 204 (i.e., as indicated by column 724) and deactivate the thermostat 338 (i.e., as indicated by column 722).

In row 732 of the illustrative table 700, presuming a previous output state of the thermostat 338 to be off or inactive (i.e., as indicated by column 706) and a previous output state of the fan activation relay 334 to be on or active (i.e., as indicated by column 704), and presuming a determination that the current measured temperature of the sump 222 $T_{current}$ is not less than the reference threshold (i.e., as indicated in column 712), a determination is made by the controller 302 in block 612 (i.e., as indicated by column 710) that the retarder is active, that the engine brake is active, or that a fault state is present. As a result, a signal is output to the fan activation relay 334 to turn on or activate the heat exchanger 204 (i.e., as indicated by column 724) and deactivate the thermostat 338 (i.e., as indicated by column 722).

In row 734 of the illustrative table 700, presuming (i) a previous output state of the thermostat 338 to be off or inactive (i.e., as indicated by column 706) and a previous output state of the fan activation relay 334 to be off or inactive (i.e., as indicated by column 704), (ii) a determination that the retarder is not active, that the engine brake is not active, and that no faults are present (i.e., as indicated in column 710), (iii) a determination that the current measured temperature of the sump 222 $T_{current}$ is not less than the reference threshold (i.e., as indicated in column 712), (iv) a determination that the predicted temperature $T_{predict}$ of the sump 222 is not greater than the first temperature threshold (i.e., as indicated in column 714), (v) a determination that the current measured temperature of the sump 222 $T_{current}$ is not greater than the second reference threshold (i.e., as indicated in column 716), and (vi) a determination that the current measured temperature of the sump 222 $T_{current}$ is not less than the third temperature threshold (i.e., as indicated in column 718), the controller 302 maintains the signal output to the thermostat 338 (i.e., as indicated in column 722) and to the fan activation relay 334 (i.e., as indicated in column 724). As a result, the previous and next states of the thermostat 338 and the fan activation relay 334 are the same in row 734.

In row 736 of the illustrative table 700, presuming (i) a previous output state of the thermostat 338 to be off or inactive (i.e., as indicated by column 706) and a previous output state of the fan activation relay 334 to be off or inactive (i.e., as indicated by column 704), (ii) a determination that the retarder is not active, that the engine brake is not active, and that no faults are present (i.e., as indicated in column 710), (iii) a determination that the current measured temperature of the sump 222 $T_{current}$ is not less than the reference threshold (i.e., as indicated in column 712), (iv) a determination that the predicted temperature $T_{predict}$ of the sump 222 is not greater than the first temperature threshold (i.e., as indicated in column 714), and (v) a determination that the current measured temperature of the sump 222 $T_{current}$ is less than the third temperature threshold (i.e., as indicated in column 718), the controller 302 outputs a signal to turn off or deactivate the fan activation relay 334 (i.e., as indicated by column 724). As a result, the previous and next states of the thermostat 338 and the fan activation relay 334 are the same in row 736.

In row 738 of the illustrative table 700, presuming (i) a previous output state of the thermostat 338 to be off or inactive (i.e., as indicated by column 706) and a previous output state of the fan activation relay 334 to be off or inactive (i.e., as indicated by column 704), (ii) a determination that the retarder is not active, that the engine brake is not active, and that no faults are present (i.e., as indicated in column 710), (iii) a determination that the current measured temperature of the sump 222 $T_{current}$ is not less than the reference threshold (i.e., as indicated in column 712), and (iv) a determination that the current measured temperature of the sump 222 $T_{current}$ is greater than the second temperature threshold (i.e., as indicated in column 716), the controller 302 outputs a signal to turn on or activate the fan activation relay 334 (i.e., as indicated in column 724). As a result, the controller 302 cools the sump 222 by the cooling system 202.

In row 740 of the illustrative table 700, presuming (i) a previous output state of the thermostat 338 to be off or inactive (i.e., as indicated by column 706) and a previous output state of the fan activation relay 334 to be off or inactive (i.e., as indicated by column 704), (ii) a determination that the retarder is not active, that the engine brake is not active, and that no faults are present (i.e., as indicated in column 710), (iii) a determination that the current measured temperature of the sump 222 $T_{current}$ is not less than the reference threshold (i.e., as indicated in column 712), and (iv) a determination that the predicted temperature $T_{predict}$ of the sump 222 is greater than the first temperature threshold, the controller 302 outputs a signal to turn on or activate the fan activation relay 334 (i.e., as indicated in column 724). As a result, the controller 302 cools the sump 222 by the cooling system 202.

In row 742 of the illustrative table 700, presuming (i) a previous output state of the thermostat 338 to be off or inactive (i.e., as indicated by column 706) and a previous output state of the fan activation relay 334 to be on or active (i.e., as indicated by column 704), (ii) a determination that the retarder is not active, that the engine brake is not active, and that no faults are present (i.e., as indicated in column 710), (iii) a determination that the current measured temperature of the sump 222 $T_{current}$ is not less than the reference threshold (i.e., as indicated in column 712), (iv) a determination that the predicted temperature $T_{predict}$ of the sump 222 is not greater than the first temperature threshold (i.e., as indicated in column 714), (v) a determination that the current measured temperature of the sump 222 $T_{current}$ is not greater than the second reference threshold (i.e., as indicated in column 716), and (vi) a determination that the current measured temperature of the sump 222 $T_{current}$ is not less than the third temperature threshold (i.e., as indicated in column 718), the controller 302 maintains the signal output to the thermostat 338 (i.e., as indicated in column 722) and to the fan activation relay 334 (i.e., as indicated in column

724). As a result, the previous and next states of the thermostat 338 and the fan activation relay 334 are the same in row 742.

In row 744 of the illustrative table 700, presuming (i) a previous output state of the thermostat 338 to be off or inactive (i.e., as indicated by column 706) and a previous output state of the fan activation relay 334 to be on or active (i.e., as indicated by column 704), (ii) a determination that the retarder is not active, that the engine brake is not active, and that no faults are present (i.e., as indicated in column 710), (iii) a determination that the current measured temperature of the sump 222 $T_{current}$ is not less than the reference threshold (i.e., as indicated in column 712), (iv) a determination that the predicted temperature $T_{predict}$ of the sump 222 is not greater than the first temperature threshold (i.e., as indicated in column 714), and (v) a determination that the current measured temperature of the sump 222 $T_{current}$ is less than the third temperature threshold (i.e., as indicated in column 718), the controller 302 outputs a signal to turn off or deactivate the fan activation relay 334 (i.e., as indicated by column 724). As a result, the controller 302 disables cooling of the sump 222 by the cooling system 202.

In row 746 of the illustrative table 700, presuming (i) a previous output state of the thermostat 338 to be off or inactive (i.e., as indicated by column 706) and a previous output state of the fan activation relay 334 to be on or active (i.e., as indicated by column 704), (ii) a determination that the retarder is not active, that the engine brake is not active, and that no faults are present (i.e., as indicated in column 710), (iii) a determination that the current measured temperature of the sump 222 $T_{current}$ is not less than the reference threshold (i.e., as indicated in column 712), and (iv) a determination that the current measured temperature of the sump 222 $T_{current}$ is greater than the second temperature threshold (i.e., as indicated in column 716), the controller 302 outputs a signal to turn on or activate the fan activation relay 334 (i.e., as indicated in column 724). As a result, the controller 302 cools the sump 222 by the cooling system 202.

In row 748 of the illustrative table 700, presuming (i) a previous output state of the thermostat 338 to be off or inactive (i.e., as indicated by column 706) and a previous output state of the fan activation relay 334 to be on or active (i.e., as indicated by column 704), (ii) a determination that the retarder is not active, that the engine brake is not active, and that no faults are present (i.e., as indicated in column 710), (iii) a determination that the current measured temperature of the sump 222 $T_{current}$ is not less than the reference threshold (i.e., as indicated in column 712), and (iv) a determination that the predicted temperature $T_{predict}$ of the sump 222 is greater than the first temperature threshold, the controller 302 outputs a signal to turn on or activate the fan activation relay 334 (i.e., as indicated in column 724). As a result, the controller 302 cools the sump 222 by the cooling system 202.

Figure 8:
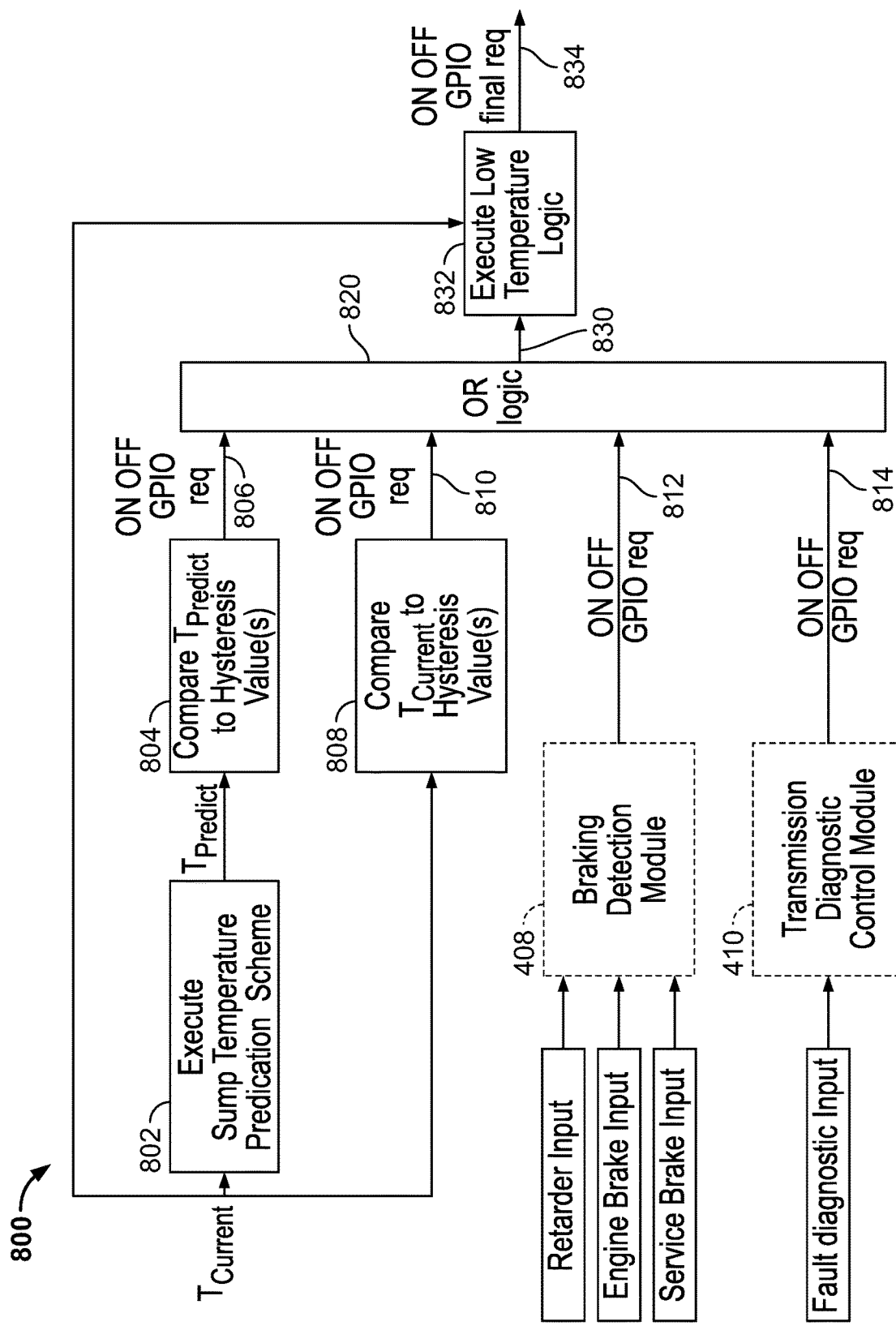
FIG. 8 is a block diagram illustrating performance of a prediction method by one of the sump temperature prediction modules of the controller diagrammatically depicted in FIG. 4.

Referring now to FIG. 8, an illustrative method 800 of operating the transmission system 200 may be embodied as, or otherwise include, a set of instructions that are executable by the control system 300 (i.e., one of the sump temperature prediction modules 404, 406, the braking detection module 408, and the transmission diagnostic control module 410). For clarity and ease of illustration, the method 800 is depicted diagrammatically as a block diagram that may be performed in one or more sequences.

In the illustrative method 800, in block 802, the controller 302 executes the sump temperature prediction scheme associated with block 610 based on, among other things, the current measured temperature $T_{current}$ of the sump 222. Following execution of the prediction scheme associated with block 610, the predicted temperature $T_{predict}$ of the sump 222 is determined by the controller 302.

In block 804 of the illustrative method 800, the controller 302 compares the predicted temperature $T_{predict}$ of the sump 222 to one or more reference hysteresis values that may be characterized by, or otherwise account for, lag, delay, and/or history dependence of the predicted temperature $T_{predict}$ of the sump 222 during operation of the transmission system 200. In at least some embodiments, the one or more reference hysteresis values associated with block 804 may include, or otherwise be embodied as, a low temperature threshold value of about 110° Celsius. Additionally, in at least some embodiments, the one or more reference hysteresis values associated with block 804 may include, or otherwise be embodied as, a high temperature threshold value of about 115° Celsius. In any case, following the comparison made in block 804, a first signal or request 806 is provided to an OR logic block 820.

In block 808 of the illustrative method 800, the controller 302 compares the current measured temperature $T_{current}$ of the sump 222 to one or more reference hysteresis values that may be characterized by, or otherwise account for, lag, delay, and/or history dependence of the predicted temperature $T_{predict}$ of the sump 222 during operation of the transmission system 200. In at least some embodiments, the one or more reference hysteresis values associated with block 808 may include, or otherwise be embodied as, a low temperature threshold value of about 110° Celsius. Additionally, in at least some embodiments, the one or more reference hysteresis values associated with block 808 may include, or otherwise be embodied as, a high temperature threshold value of about 115° Celsius. In any case, following the comparison made in block 808, a second signal or request 810 is provided to the OR logic block 820.

In the illustrative method 800, the braking detection module 408 provides a third signal or request 812 to the OR logic block 820. It should be appreciated that the request 812 provided by the braking detection module 408 may be based on, and may account for, the retarder input provided by the retarder sensing device 312, the engine brake input provided by the engine brake sensing device 314, and the service brake input provided by the service brake sensing device 310. Furthermore, it should be appreciated that the input provided by the retarder sensing device 312 may indicate an activated or de-activated state of the retarder that is associated with one or more activation or de-activation sources.

The illustrative braking detection module 408, at least in some embodiments, may improve performance of the retarder (e.g., permit the retarder to convert increased kinetic energy to heat) and thereby increase the braking capability of the vehicle compared to other configurations. As a consequence of performance of the method 800 by the controller 302, activation of the fan(s) 206 of the cooling system 202 during braking of the vehicle (e.g., using the retarder, the engine brake, and/or the service brake) may be associated with, or otherwise characterized by, an increased energy demand that further facilitates braking. Presuming cooling of the sump 222 and the oil stored therein by the cooling system 202 during each instance of braking, a lower average resulting temperature of the sump 222 may provide, or otherwise be associated with, a decreased energy demand (e.g., decreased energy for activating the fan(s) 206) and thereby a fuel-savings benefit, at least compared to other configurations.

In the illustrative method 800, the transmission diagnostic module 410 provides a fourth signal or request 814 to the OR logic block 820. It should be appreciated that the request 814 may be based on, and may account for, the fault diagnostic input provided by the one or more fault diagnostic devices 316.

In the OR logic block 820 of the illustrative method 800, the controller 302 receives the first, second, third, and fourth signals 806, 810, 812, 814 and performs one or more actions based thereon. In one example, if the predicted temperature $T_{predict}$ of the sump 222 is at or above a high temperature threshold (e.g., a high temperature hysteresis value associated with block 804) as indicated by the signal 806, the controller 302 activates the fan activation relay 334 to enable cooling of the sump 222 by the cooling system 202. In another example, if the current measured temperature $T_{current}$ of the sump 222 is at or above a high temperature threshold (e.g., a high temperature hysteresis value associated with block 808) as indicated by the signal 810, the controller 302 activates the fan activation relay 334 to enable cooling of the sump 222 by the cooling system 202. In yet another example, if the braking input (e.g., the input indicated by the signal 812) is indicative of engagement or activation of the retarder, the engine brake, and/or the service brake of the vehicle, the controller 302 activates the fan activation relay 334 to enable cooling of the sump 222 by the cooling system 202. In yet another example still, if the fault diagnostic input (e.g., the input indicated by the signal 814) is indicative of a fault state of the vehicle and/or the transmission system 200, the controller 302 activates the fan activation relay 334 to enable cooling of the sump 222 by the cooling system 202. In each one of the aforementioned examples in which the controller 302 enables cooling via the cooling system 202, a signal or request 830 output from the OR logic block 820 includes, or is otherwise embodied as, a request to activate the fan activation relay 334 and thereby cool the sump 222 via the cooling system 202.

It should be appreciated that, if the controller 302 in OR logic block 820 determines that (i) the predicted temperature $T_{predict}$ of the sump 222 is not at or above the high temperature threshold, (ii) the current measured temperature $T_{current}$ of the sump 222 is not at or above the high temperature threshold, (iii) no braking input indicative of activation of the retarder, the engine brake, and/or the service brake has been provided, and (iv) no input indicative of a fault state of the vehicle and/or the transmission system 200 has been provided, the signal 830 output from the OR logic block 820 includes, or is otherwise embodied as, a request to de-activate (or maintain deactivation of) the relay 334 to turn off the heat exchanger 204 and prevent cooling via the cooling system 202. Regardless, in the illustrative method 800, the signal 830 output from the OR logic block 820, as well as the current measured temperature $T_{current}$ of the sump 222, are provided to block 832.

In block 832 of the illustrative method 800, the controller 302 executes low temperature logic based on the current measured temperature $T_{current}$ of the sump 222. In one example, in the event that the signal 830 includes, or is otherwise embodied as, a request to activate the fan activation relay 334 and thereby cool the sump 222 via the cooling system 202, the controller 302 may block activation of the cooling system 202 if the controller 302 determines that the current measured temperature $T_{current}$ of the sump 222 is less than a reference threshold (e.g., the reference threshold associated with block 604 of the method 600). In that example, activation of the cooling system 202 may be blocked due to, or may be blocked as a consequence of, activation of the thermostat 338. It should be appreciated that the low temperature logic executed in block 832 may be substantially similar to the logic associated with blocks 604 and 606 of the illustrative method 600. In any case, following completion of block 832, a signal 834 is output from the block 832.

Figure 9:
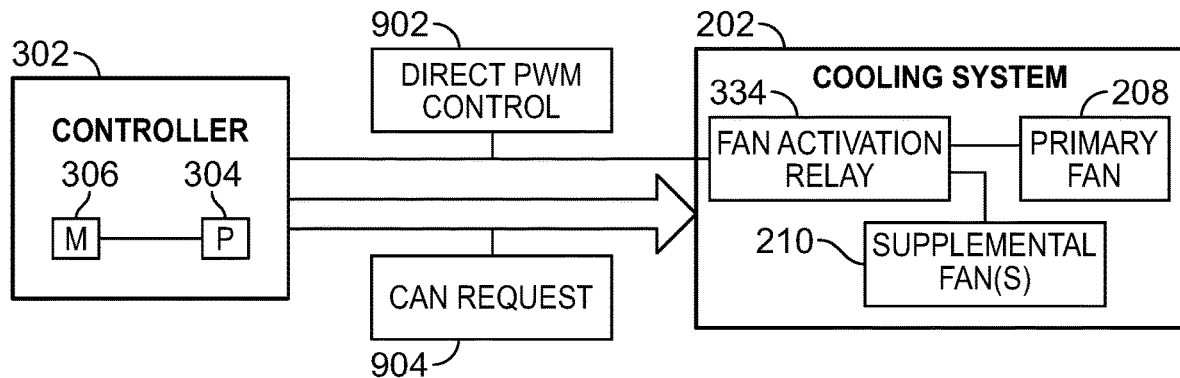
FIG. 9 is a block diagram depicting multiple communicative couplings that may be established between the controller and a cooling system included in the transmission system during the performance of the method illustrated in FIG. 8.

Referring now to FIG. 9, at least in some embodiments, the controller 302 may be communicatively coupled to the cooling system 202 via a direct (e.g., hardwired) connection. In such embodiments, the controller 302 may control operation of the fan activation relay 334, the primary fan 208, and/or the one or more supplemental fans 210 by pulse width modulation as indicated by block 902. In other embodiments, the controller 302 may be communicatively coupled to the cooling system 202 via a controller area network (CAN). In such embodiments, the controller 302 may control operation of the fan activation relay 334, the primary fan 208, and/or the one or more supplemental fans 210 by a CAN request as indicated by block 904.

Figure 10:
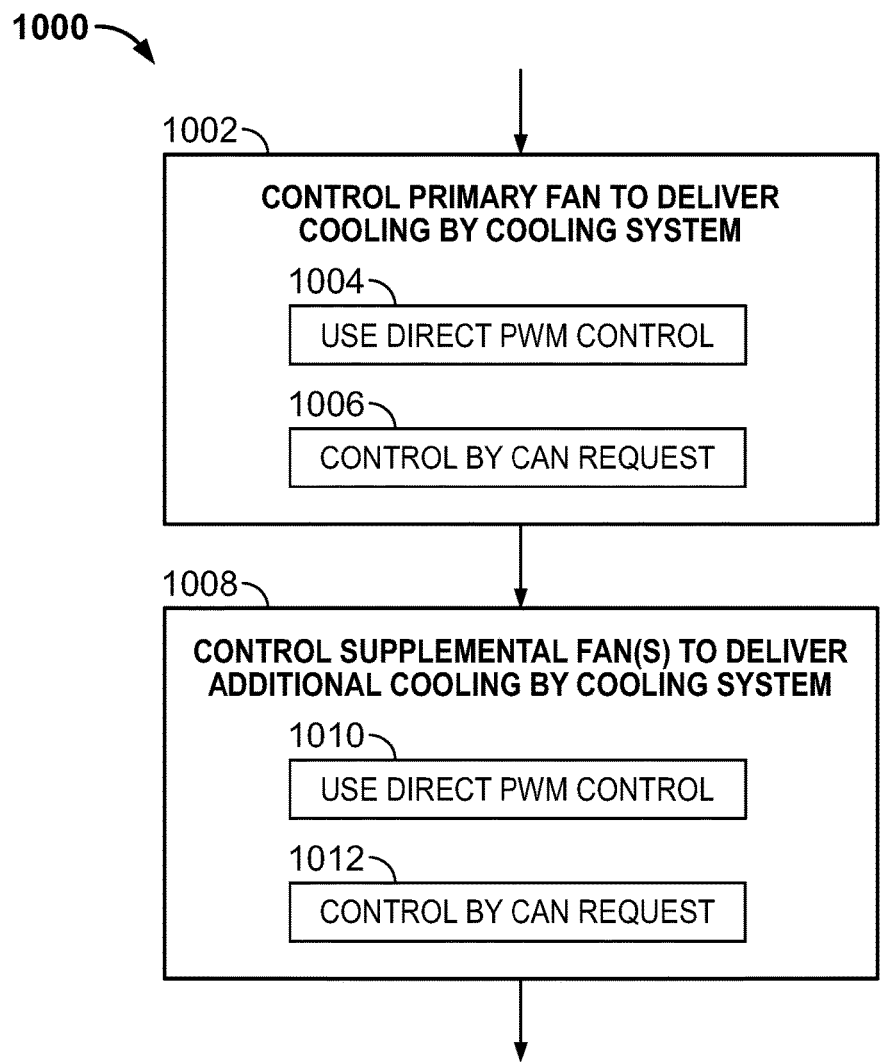
FIG. 10 is a simplified flowchart of another method that may be performed by the sump temperature management and cooling system control module of the controller diagrammatically depicted in FIG. 4.

Referring now to FIG. 10, an illustrative method 1000 of operating the transmission system 200 may be embodied as, or otherwise include, a set of instructions that are executable by the control system 300 (i.e., the sump temperature management and cooling system control module 402 in conjunction with at least one of the sump temperature prediction modules 404, 406). The method 1000 corresponds to, or is otherwise associated with, performance of the blocks described below in the illustrative sequence of FIG. 10. It should be appreciated, however, that the method 1000 may be performed in one or more sequences different from the illustrative sequence.

The illustrative method 1000 begins with block 1002. In block 1002, presuming that cooling of the sump 222 by the cooling system 202 is enabled, the controller 302 controls the primary fan 208 to cool the sump 222 by the heat exchanger 204. To do so, the controller 302 may perform at least one of blocks 1004 and 1006. In block 1004, the controller 302 controls the primary fan 208 by pulse width modulation control (e.g., as indicated by block 902). In block 1006, the controller 302 controls the primary fan 208 by a CAN request (e.g., as indicated by block 904). In any case, from block 1002, the method 1000 subsequently proceeds to block 1008.

In block 1008 of the illustrative method 1000, presuming that cooling of the sump 222 by the cooling system 202 is enabled, the controller 302 controls the one or more supplemental fans 210 to deliver additional cooling by the heat exchanger 204. To do so, the controller 302 may perform at least one of blocks 1010 and 1012. In block 1010, the controller 302 controls the one or more supplemental fans 210 by pulse width modulation control (e.g., as indicated by block 902). In block 1012, the controller 302 controls the one or more supplemental fans 210 by a CAN request (e.g., as indicated by block 904).

Figure 11:
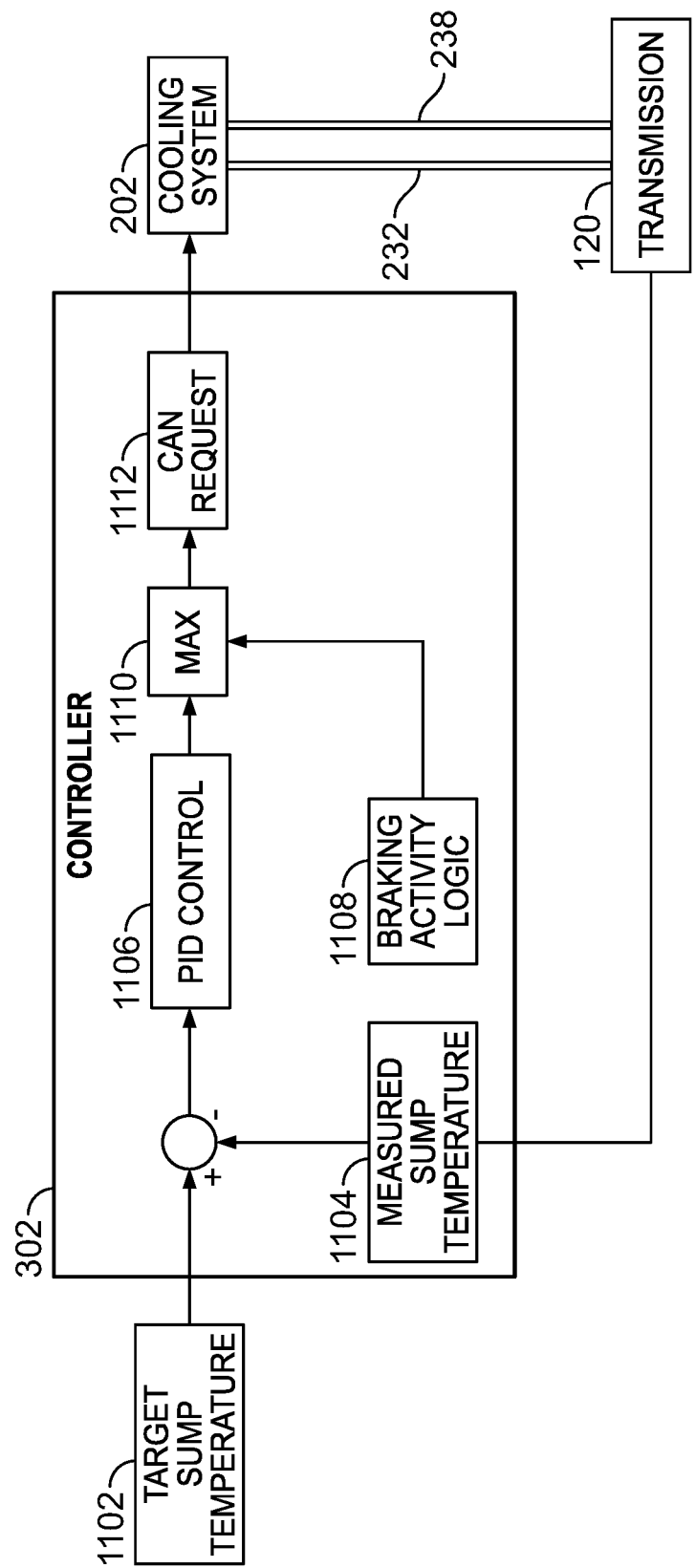
FIG. 11 is a block diagram depicting communication between the controller and the cooling system via a controller area network during the performance of the method illustrated in FIG. 8.

Referring now to FIG. 11, an illustrative diagram 1100 depicts communication between the controller 302 and the cooling system 202 in use of the transmission system 200 (e.g., during performance of the method 600). At least in some embodiments, the operations described below may be performed by at least one of the sump temperature prediction modules 404, 406 during performance of the method 600.

In the illustrative embodiment, a target sump temperature 1102 and a measured sump temperature 1104 are provided as inputs to the controller 302. It should be appreciated that in at least some embodiments, the target sump temperature 1102 may be determined based on, among other things, the current measured temperature $T_{current}$ of the sump 222 (i.e., as indicated by the sump temperature sensing device 336) and/or the predicted temperature $T_{predict}$ of the sump 222. Additionally, in at least some embodiments, the target sump temperature 1102 may be determined based on, among other things, input provided by an operator and/or one or more lookup tables stored in the memory 306 of the controller 302. In any case, in the illustrative embodiment, the measured sump temperature 1104 is determined based on the current measured temperature $T_{current}$ of the sump 222.

In block 1106 of the illustrative diagram 1100, proportional-integral-derivative (PID) control is performed by the controller 302 based on the target sump temperature 1102 and the measured sump temperature 1104. At least in some embodiments, PID control performed in block 1106 may include, or otherwise be embodied as, calculation of an error value based on the difference between the target sump temperature 1102 and the measured sump temperature 1104 and correction and/or adjustment of the calculated error value based on one or more terms or coefficients (e.g., a proportional term, an integral term, and a derivative term). In such embodiments, those terms or coefficients may be affected by, or determined based on, the current measured temperature $T_{current}$ of the sump 222 and the measured ambient air temperature (i.e., based on the input from the ambient air temperature sensing device 326), among other things.

In block 1108 of the illustrative diagram 1100, braking activity logic may be performed by the controller 302 (e.g., the braking detection module 408) substantially contemporaneously, and/or in parallel with, the performance of PID control in block 1106. It should be appreciated that performance of the braking activity logic in block 1108 may include, or otherwise be embodied as, receipt of braking input associated with the retarder, the engine brake, and the service brake of the vehicle (i.e., from the retarder sensing device 312, the engine brake sensing device 314, and the service brake sensing device 310, respectively).

In block 1110 of the illustrative diagram 1100, outputs from the PID control block 1106 and the braking activity logic block 1108 are provided as inputs. In the illustrative embodiment, any braking activity (e.g., activation of one or more of the retarder, the engine brake, and the service brake) determined following performance of block 1108 results in, or otherwise associated with, a maximum or 100% activation signal provided as a CAN request 1112 to the cooling system 202 following performance of block 1110. That is, any braking activity results in, or otherwise associated with, a CAN request to provide maximum cooling via the cooling system 202. It should be appreciated, however, that in the event no braking activity is determined following performance of block 1108, another activation signal may be provided as CAN request 1112 to the cooling system 202 that corresponds to, or is otherwise associated with, less cooling (i.e., <100% cooling) by the cooling system 202. Therefore, in the illustrative embodiment, via the CAN request 1112, the controller 302 is configured to provide a fan activation signal to achieve continuous percentage control (e.g., any percentage between 0-100% of maximum cooling) of cooling by the cooling system 202.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

The invention claimed is:

1. A transmission for a vehicle, the transmission comprising:
   a sump configured to store transmission oil; and
   a control system having a plurality of sensors and a controller coupled to the plurality of sensors that has a processor and a memory device coupled to the processor,
   wherein the plurality of sensors include a first brake sensor configured to provide brake sensor data indicative of a state of a first braking device of the vehicle and a fault diagnostic sensor configured to provide fault diagnostic data indicative of a fault state of the vehicle, and
   wherein the memory device has instructions stored therein that are executable by the processor to cause the processor to receive the brake sensor data from the first brake sensor and the fault diagnostic data from the fault diagnostic sensor and to selectively cool the sump based on the brake sensor data and the fault diagnostic data.

2. The transmission of claim 1, wherein:
   the plurality of sensors includes a sump temperature sensor configured to provide temperature data indicative of a temperature of the sump; and
   the instructions stored in the memory device are executable by the processor to cause the processor to receive the temperature data from the sump temperature sensor, to predict a temperature of the sump based at least partially on the temperature data, and to selectively cool the sump based on the brake sensor data, the fault diagnostic data, and the predicted temperature of the sump.

3. The transmission of claim 2, wherein the instructions stored in the memory device are executable by the processor to cause the processor to compare the predicted temperature of the sump to one or more first reference hysteresis values, to compare a current temperature of the sump indicated by the temperature data to one or more second reference hysteresis values, and to selectively cool the sump based on the comparisons.

4. The transmission of claim 1, wherein the brake sensor data from the first brake sensor is indicative of a state of a retarder of the vehicle, wherein the plurality of sensors includes a second brake sensor configured to provide brake sensor data indicative of a state of an engine brake of the vehicle, and wherein the instructions stored in the memory device are executable by the processor to cause the processor to:
   receive the brake sensor data from the first and second brake sensors and the fault diagnostic data from the fault diagnostic sensor;
   determine whether the retarder is active based on the brake sensor data from the first brake sensor;
   determine whether the engine brake is active based on the brake sensor data from the second brake sensor;
   determine whether a fault is present based on the fault diagnostic data from the fault diagnostic sensor; and
   cool the sump in response to a determination that the retarder is active, that the engine brake is active, or that the fault is present.

5. The transmission of claim 4, wherein the instructions stored in the memory device are executable by the processor to cause the processor to, in response to a determination that the retarder is inactive, that the engine brake is inactive, and that the fault is not present, determine whether a predicted temperature of the sump is greater than a first temperature threshold or whether a current temperature of the sump indicated by temperature data is greater than a second temperature threshold, and to cool the sump in response to a determination that the predicted temperature of the sump is greater than the first temperature threshold or a determination that the current temperature of the sump is greater than the second temperature threshold.

6. The transmission of claim 5, wherein the instructions stored in the memory device are executable by the processor to cause the processor to, in response to a determination that the predicted temperature of the sump is not greater than the first temperature threshold and a determination that the current temperature of the sump is not greater than the second temperature threshold, determine whether the predicted temperature of the sump is less than the first temperature threshold and whether the current temperature of the sump indicated by the temperature data is less than a third temperature threshold, and to disable cooling of the sump in response to a determination that the predicted temperature of the sump is less than the first temperature threshold and the current temperature of the sump is less than the third temperature threshold.

7. The transmission of claim 1, wherein:
the instructions stored in the memory device are executable by the processor to cause the processor to determine a predicted temperature of the sump based on a predicted rate of change in sump temperature ($\Delta_{temp}$) multiplied by a prediction time interval ($t_{horizon}$) and summed with a current sump temperature sample value ($T_n$); and
the instructions stored in the memory device are executable by the processor to cause the processor to predict the rate of change in sump temperature ($\Delta_{temp}$) based on a previous predicted rate of change of sump temperature ($\Delta_{temp\_previous}$), the current sump temperature sample value ($T_n$), a previous sump temperature sample value ($T_{n-1}$), a time measurement rate ($t_{measurement\_rate}$), and a constant reference value ($K_{filter}$), and wherein the instructions stored in the memory device are executable by the processor to cause the processor to predict the rate of change in sump temperature ($66_{temp}$) according to the equation $$\Delta_{temp}=\Delta_{temp\_previous}+([T_n-T_{n-1}]/t_{measurement\_rate}-\Delta_{temp\_previous})/K_{filter}.$$

8. The transmission of claim 7, wherein the instructions stored in the memory device are executable by the processor to cause the processor to determine the constant reference value ($K_{filter}$) based on temperature sensor data indicative of an ambient air temperature and based on mode sensor data indicative of an operational mode of a torque converter or a retarder.

9. The transmission of claim 7, wherein the instructions stored in the memory device are executable by the processor to cause the processor to determine the current sump temperature sample value ($T_n$) and the previous sump temperature sample value ($T_{n-1}$) over one second time intervals and to determine the prediction time interval ($t_{horizon}$) over thirty second intervals.

10. The transmission of claim 1, wherein the instructions stored in the memory device are executable by the processor to cause the processor to:
receive the brake sensor data from the first brake sensor indicative of a state of a retarder of the vehicle;
receive brake sensor data from a second brake sensor indicative of a state of an engine brake of the vehicle;
receive brake sensor data from a third brake sensor indicative of a state of a service brake of the vehicle;
receive the fault diagnostic data from the fault diagnostic sensor indicative of the fault state of the vehicle;
receive grade data from an inclinometer indicative of a grade of a surface on which the vehicle is positioned;
receive accelerator data from an accelerator sensor indicative of depression of an accelerator pedal of the vehicle;
receive temperature data from an air temperature sensor indicative of an ambient air temperature;
receive input provided by an operator;
receive mode sensor data from a torque converter sensor indicative of an operational mode of a torque converter; and
selectively cool the sump based on the brake sensor data from the first, second, and third brake sensors, the fault diagnostic data, the grade data, the accelerator data, the temperature data, the input provided by the operator, and the mode sensor data.

11. A control system for a vehicle that includes a transmission configured to receive rotational power supplied by a drive unit and provide the rotational power to a load and a cooling device coupled to the transmission and configured to cool a sump of the transmission to manage transmission oil temperature, the control system comprising:
a first brake sensor configured to provide brake sensor data indicative of a state of a first braking device of the vehicle;
a fault diagnostic sensor configured to provide fault diagnostic data indicative of a fault state of the vehicle;
a sump temperature sensor configured to provide temperature data indicative of a temperature of the sump; and
a controller communicatively coupled to the first brake sensor, the fault diagnostic sensor, and the sump temperature sensor,
wherein the controller includes a memory device having instructions stored therein that are executable by a processor to cause the processor to receive the brake sensor data from the first brake sensor and the fault diagnostic data from the fault diagnostic sensor, to receive the temperature data from the sump temperature sensor, to predict a temperature of the sump based at least partially on the temperature data, and to selectively cool the sump by the cooling device based on the brake sensor data, the fault diagnostic data, and the predicted temperature of the sump.

12. The control system of claim 11, wherein the instructions stored in the memory are executable by the processor to cause the processor to:
compare the predicted temperature of the sump to one or more first reference hysteresis values;
compare a current temperature of the sump indicated by the temperature data to one or more second reference hysteresis values; and
selectively cool the sump by the cooling device based on the comparisons.

13. The control system of claim 11, further comprising a second brake sensor configured to provide brake sensor data indicative of a state of a second braking device of the vehicle,
wherein the instructions stored in the memory are executable by the processor to cause the processor to:
receive the brake sensor data from the first and second brake sensors and the fault diagnostic data from the fault diagnostic sensor;

determine whether a retarder of the vehicle is active based on the brake sensor data from the first brake sensor;

determine whether an engine brake of the vehicle is active based on the brake sensor data from the second brake sensor;

determine whether a fault is present based on the fault diagnostic data from the fault diagnostic sensor; and cool the sump by the cooling device in response to a determination that the retarder is active, that the engine brake is active, or that the fault is present.

14. The control system of claim 13, wherein the instructions stored in the memory device are executable by the processor to cause the processor to, in response to a determination that the retarder is inactive, that the engine brake is inactive, and that the fault is not present, determine whether the predicted temperature of the sump is greater than a first temperature threshold or whether a current temperature of the sump indicated by the temperature data is greater than a second temperature threshold, and to cool the sump by the cooling device in response to a determination that the predicted temperature of the sump is greater than the first temperature threshold or a determination that the current temperature of the sump is greater than the second temperature threshold.

15. The control system of claim 14, wherein the instructions stored in the memory device are executable by the processor to cause the processor to, in response to a determination that the predicted temperature of the sump is not greater than the first temperature threshold and a determination that the current temperature of the sump is not greater than the second temperature threshold, determine whether the predicted temperature of the sump is less than the first temperature threshold and whether the current temperature of the sump indicated by the temperature data is less than a third temperature threshold, and to disable cooling of the sump by the cooling device in response to a determination that the predicted temperature of the sump is less than the first temperature threshold and the current temperature of the sump is less than the third temperature threshold.

16. The control system of claim 11, wherein the instructions stored in the memory device are executable by the processor to cause the processor to:

determine the predicted sump temperature based on a predicted rate of change in sump temperature ($\Delta_{temp}$) multiplied by a prediction time interval ($t_{horizon}$) and summed with a current sump temperature sample value ($T_n$); and predict the rate of change in sump temperature ($\Delta_{temp}$) based on a previous predicted rate of change of sump temperature ($\Delta_{temp\_previous}$), the current sump temperature sample value ($T_n$), a previous sump temperature sample value ($T_{n-1}$), a time measurement rate ($T_{measurement\_rate}$), and a constant reference value ($K_{filter}$) according to the equation $\Delta_{temp} = \Delta_{temp\_previous} + ([T_n - T_{n-1}]/t_{measurement\_rate} - \Delta_{temp\_previous})/K_{filter}$.

17. A method of operating a vehicle that includes a transmission configured to receive rotational power supplied by a drive unit and provide the rotational power to a load and a cooling device fluidly coupled to the transmission and configured to cool a sump of the transmission to manage transmission oil temperature, the method comprising:

receiving, by a controller of the vehicle, brake sensor data provided by a first brake sensor of the vehicle that is indicative of a state of a first braking device of the vehicle;

receiving, by the controller, fault diagnostic data provided by a fault diagnostic sensor of the vehicle that is indicative of a fault state of the vehicle;

receiving, by the controller, temperature data provided by a sump temperature sensor of the vehicle that is indicative of a temperature of the sump;

predicting, by the controller, a temperature of the sump based at least partially on the temperature data; and selectively cooling, by the controller using the cooling device, the sump based on the brake sensor data, the fault diagnostic data, and the predicted temperature of the sump.

18. The method of claim 17, further comprising:

comparing, by the controller, the predicted temperature of the sump to one or more first reference hysteresis values;

comparing, by the controller, a current temperature of the sump indicated by the temperature data to one or more second reference hysteresis values; and selectively cooling, by the controller using the cooling device, the sump based on the comparisons.

19. The method of claim 17, further comprising:

receiving, by the controller, brake sensor data provided by a second brake sensor of the vehicle that is indicative of a state of a second braking device of the vehicle;

determining, by the controller, whether a retarder of the vehicle is active based on the brake sensor data from the first brake sensor;

determining, by the controller, whether an engine brake of the vehicle is active based on the brake sensor data from the second brake sensor;

determining, by the controller, whether a fault is present based on the fault diagnostic data from the fault diagnostic sensor; and cooling, by the controller using the cooling device, the sump in response to a determination that the retarder is active, that the engine brake is active, or that the fault is present.

20. The method of claim 19, further comprising:

determining, by the controller in response to a determination that the retarder is inactive, that the engine brake is inactive, or that the fault is not present, whether the predicted temperature of the sump is greater than a first temperature threshold or whether a current temperature of the sump indicated by the temperature data is greater than a second temperature threshold; and cooling, by the controller using the cooling device, the sump in response to a determination that the predicted temperature of the sump is greater than the first temperature threshold or a determination that the current temperature of the sump is greater than the second temperature threshold.

* * * * *